US012808690B2

(12) United States Patent
Kazar et al.

(10) Patent No.: US 12,808,690 B2
(45) Date of Patent: Nov. 24, 2026

(54) METHOD FOR AGENTIC COURSE OF ACTION GENERATION AND SIMULATION VIA SPATIAL REASONING

(71) Applicant: Exia Labs, Inc., Seattle, WA (US)

(72) Inventors: Serj Kazar, Los Angeles, CA (US); Jonathan Pan, Bellevue, WA (US); Connor Walsh, Los Angeles, CA (US)

(73) Assignee: Exia Labs, Inc., Seattle, WA (US)

( * ) Notice: Subject to any disclaimer, the term of this patent is extended or adjusted under 35 U.S.C. 154(b) by 0 days.

(21) Appl. No.: 19/461,032

(22) Filed: Jan. 27, 2026

(65) Prior Publication Data

US 2026/0219069 A1 Jul. 30, 2026

Related U.S. Application Data

(60) Provisional application No. 63/928,476, filed on Dec. 1, 2025, provisional application No. 63/864,565, filed on Aug. 15, 2025, provisional application No. 63/751,377, filed on Jan. 30, 2025.

(51) Int. Cl.

| | |
|---|---|
| ***G01C 21/00*** | (2006.01) |
| ***G06T 17/05*** | (2011.01) |
| ***G06T 17/20*** | (2006.01) |

(52) U.S. Cl.

CPC ..... *G01C 21/3878* (2020.08); *G01C 21/3819* (2020.08); *G06T 17/05* (2013.01); *G06T 17/20* (2013.01)

(58) Field of Classification Search

CPC ............ G01C 21/3819; G01C 21/3878; G06T 17/05; G06T 17/20

See application file for complete search history.

(56) References Cited

U.S. PATENT DOCUMENTS

| | | | | |
|---|---|---|---|---|
| 2004/0007121 A1* | 1/2004 | Graves | F41G 3/04 | 705/400 |
| 2023/0106432 A1* | 4/2023 | Baumgartner | G05D 1/221 | 701/2 |

* cited by examiner

*Primary Examiner* — Charles J Han

(74) *Attorney, Agent, or Firm* — Run8 Patent Group, LLC; Peter Miller; Brian T. Chew

(57) ABSTRACT

A method includes: accessing operations data for a mission; deriving characteristics of the mission from the set of operations data; accessing a navigation mesh structure including a set of polygons representing traversable areas in a operational environment and connected by edges representing thoroughfares between adjacent polygons accessible by a target entity; invoking agents to generate a course of action for the mission by calculating a target path, from an initial polygon containing an initial position occupied by a target entity to a target polygon containing a target position for the entity via the set of polygons, based on cost values of polygons; invoking agents to simulate execution of the course of action; calculating a set of effects based on simulated execution of the course of action; generating a visualization indicating a description of the course of action and the set of effects; and serving the visualization to a user.

7 Claims, 4 Drawing Sheets

METHOD FOR AGENTIC COURSE OF ACTION GENERATION AND SIMULATION VIA SPATIAL REASONING

CROSS-REFERENCE TO RELATED APPLICATIONS

This Application claims the benefit of U.S. Provisional Application No. 63/928,476, filed on 1 Dec. 2025, U.S. Provisional Application No. 63/864,565, filed on 15 Aug. 2025, and U.S. Provisional Application No. 63/751,377, filed on 30 Jan. 2025, each of which is incorporated in its entirety by this reference.

TECHNICAL FIELD

This invention relates generally to the field of decision advantage and, more specifically, to a new and useful method for agentic course of action generation and simulation via spatial reasoning within the field of decision advantage.

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. Methods

Figure 1:
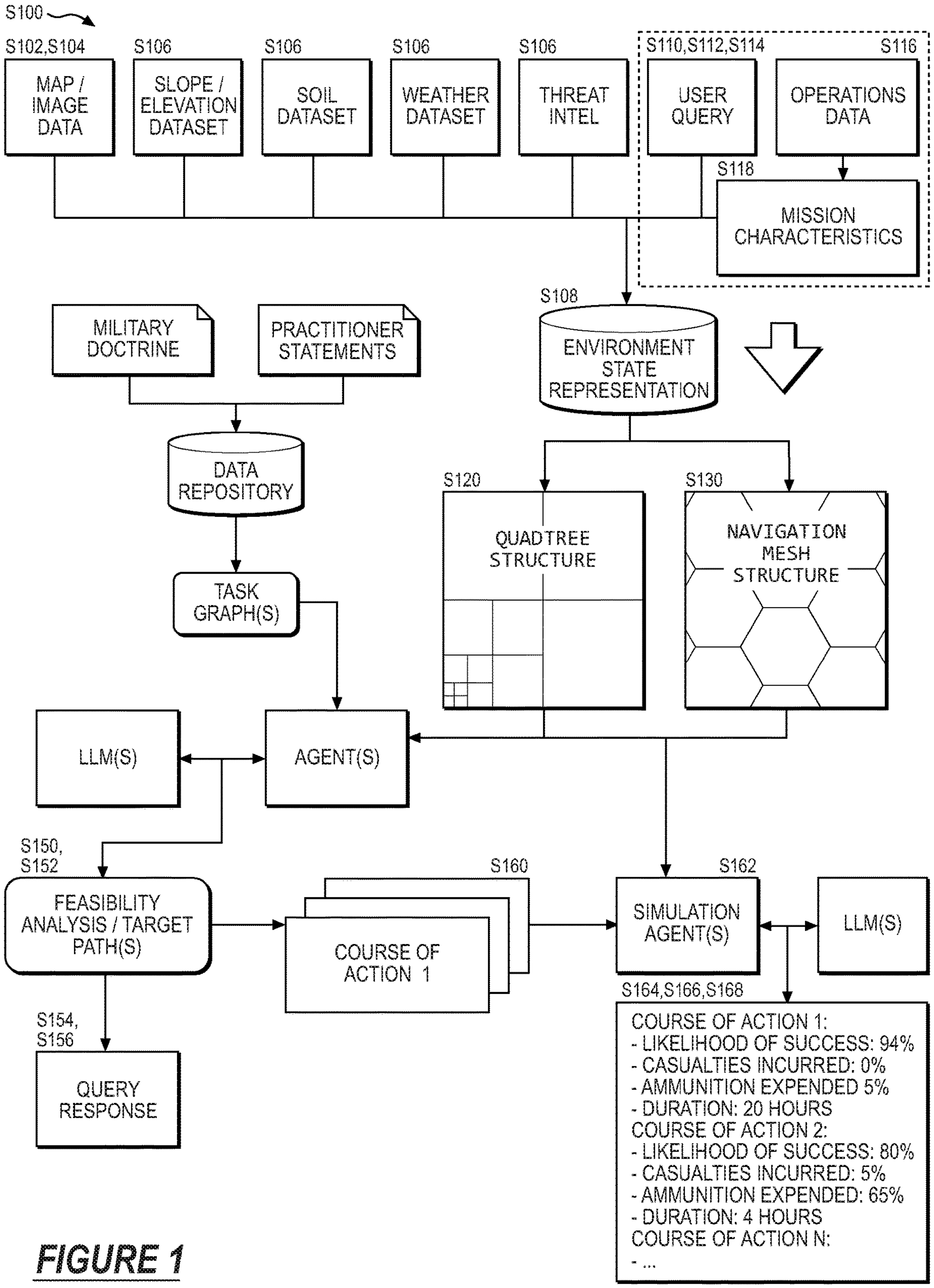
FIG. 1 is a flowchart representation of a method.
Figure 3A:
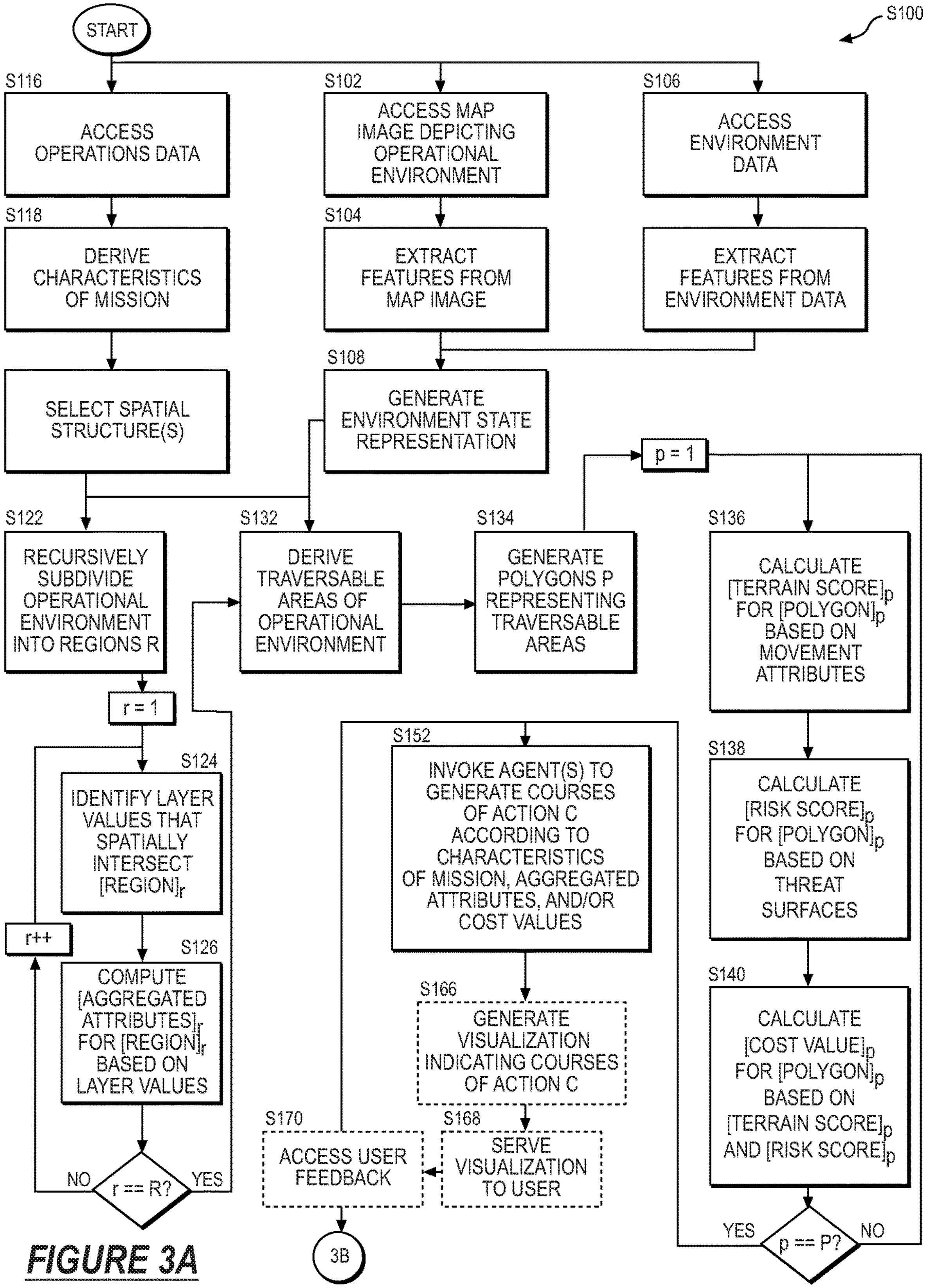
FIGS. 3A and 3B are flowchart representations of one variation of the method.

As shown in FIGS. 1 and 3A, a method S100 includes: accessing a set of operations data for a mission from a user in Block S116; deriving a set of characteristics of the mission based on the set of operations data in Block S118; and accessing an environment state representation including a set of layers in Block S108. The set of characteristics include: a target entity; and a target position, in an operational environment, for the target entity and representing an objective of the mission. The set of layers include: a first layer representing topography of the operational environment relative to a reference coordinate system; a second layer representing a set of roads in the operational environment relative to the reference coordinate system; and a third layer including a set of surfaces, in the reference coordinate system, representing threat effects of weapons systems of a set of threat entities occupying positions in the operational environment.

The method S100 also includes generating a navigation mesh structure based on the set of layers, in Block S130, by: deriving a set of areas, in the operational environment and relative to the reference coordinate system, traversable by the target entity in Block S132; and generating a set of polygons representing the set of areas and connected by a set of edges representing thoroughfares between adjacent polygons and accessible by the target entity in Block S134. Each polygon is characterized by a set of movement attributes.

The method S100 further includes, for each polygon in the set of polygons: calculating a terrain score, in a set of terrain scores, based on the set of movement attributes in Block S136; and calculating a risk score, in a set of risk scores, based on intersection between the polygon and surfaces in the set of surfaces in Block S138.

The method S100 also includes: invoking a set of agents to generate a first course of action for the mission by calculating a target path, from an initial polygon containing an initial position occupied by the target entity to a target polygon containing the target position via the set of polygons, based on the set of terrain scores and the set of risk scores in Block S160; generating a visualization indicating the first course of action in Block S166; and serving the visualization to the user in Block S168.

1.1 Variation: Course of Action Generation+Agentic Simulation

Figure 3B:
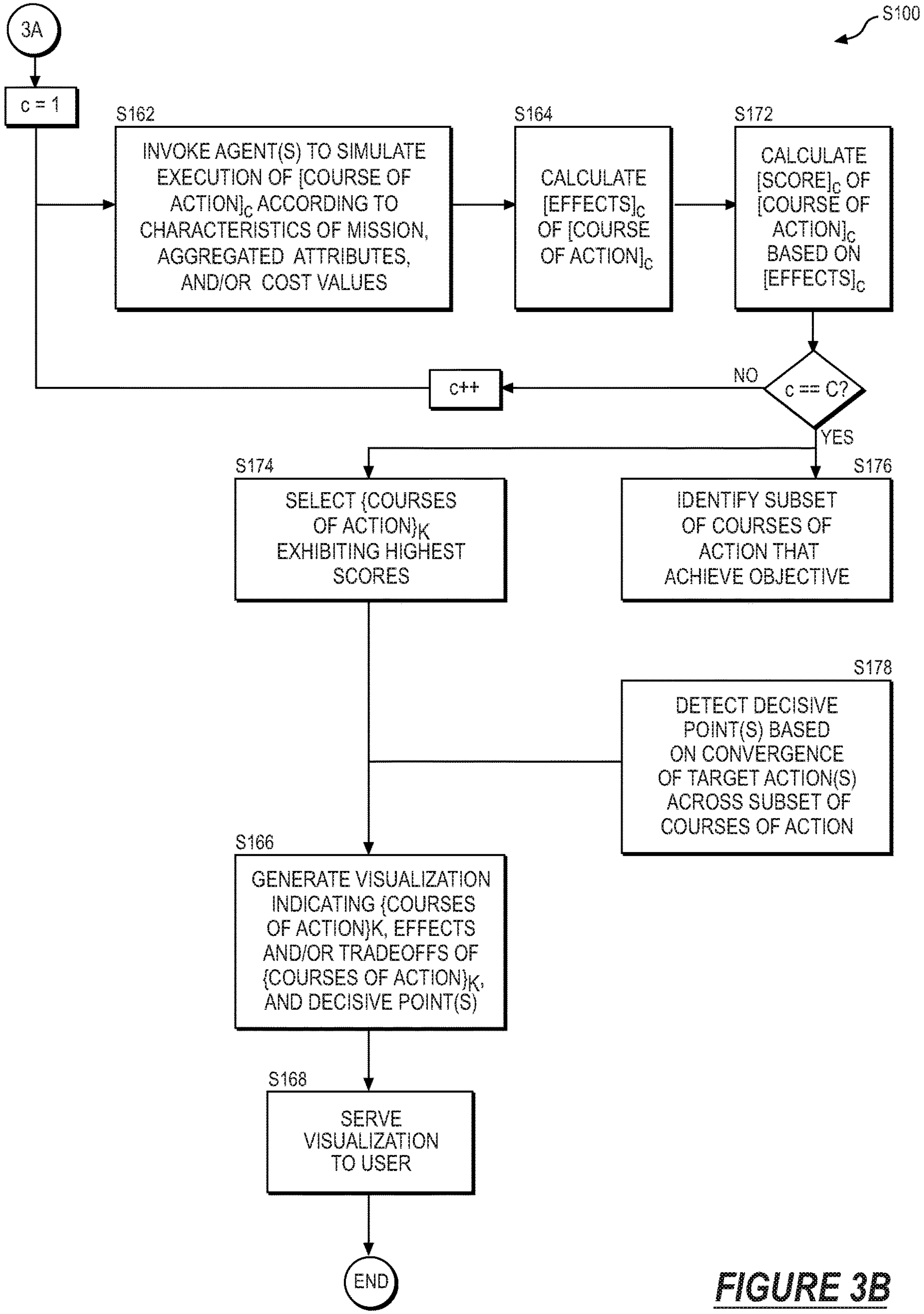

As shown in FIGS. 1, 3A, and 3B, one variation of the method S100 includes: accessing a set of operations data for a mission from a user in Block S116; deriving a set of characteristics of the mission from the set of operations data in Block S118; and accessing a navigation mesh structure including a set of polygons in Block S130. The set of characteristics includes: a target entity; and a target position, in an operational environment, for the target entity and representing an objective of the mission. The set of polygons: represents a set of areas, in the operational environment and relative to a reference coordinate system, traversable by the target entity; and is connected by a set of edges representing thoroughfares between adjacent polygons and accessible by the target entity. Each polygon in the set of polygons is characterized by: a set of movement attributes based on topography of the operational environment; and a cost value, in a set of cost values, based on the set of movement attributes.

This variation of the method S100 also includes: invoking a set of agents to generate a first course of action for the mission by calculating a target path, from an initial polygon containing an initial position occupied by the target entity to a target polygon containing the target position via the set of polygons, based on the set of cost values in Block S160; invoking the set of agents to simulate execution of the first course of action based on the navigation mesh structure in Block S162; calculating a first set of effects from the first course of action based on simulated execution of the first course of action in Block S164; generating a visualization indicating a description of the first course of action and the first set of effects from the first course of action in Block S166; and serving the visualization to the user in Block S168. The first set of effects includes: a first likelihood of achieving the objective of the mission; and a first quantity of resources consumed by the target entity.

1.2 Variation: Course of Action Simulation

As shown in FIGS. 1, 3A, and 3B, one variation of the method S100 includes, in Block S130, accessing a navigation mesh structure including a set of polygons: representing a set of areas, in an operational environment and relative to a reference coordinate system, traversable by a target entity; and connected by a set of edges representing thoroughfares between adjacent polygons and accessible by the target entity. The set of polygons includes a first polygon characterized by a first set of movement attributes based on surface composition and weather within a first area, in the set of areas, corresponding to the first polygon. The first set of movement attributes represents: a first soil type; and a first rain intensity.

This variation of the method S100 also includes accessing a first course of action for a mission in Block S160. The first course of action includes a set of actions for the target entity along a target path from an initial polygon containing an initial position occupied by the target entity to a target polygon containing a target position, for the target entity and representing an objective of the mission, via the set of polygons.

This variation of the method S100 further includes invoking a set of agents to simulate execution of a first action in the set of actions based on the first set of movement attributes in Block S162. The first action represents advancement of the target entity through the first area.

This variation of the method S100 also includes: calculating a first set of effects from the first course of action based on simulated execution of the first course of action in Block S164; generating a visualization indicating the first set of effects from the first course of action in Block S166; and serving the visualization to the user in Block S168. The first set of effects includes a fuel consumption estimate for advancement of the target entity along the target path via the first polygon.

1.3 Variation: Environment State Representation+Spatial Structure

Figure 2:
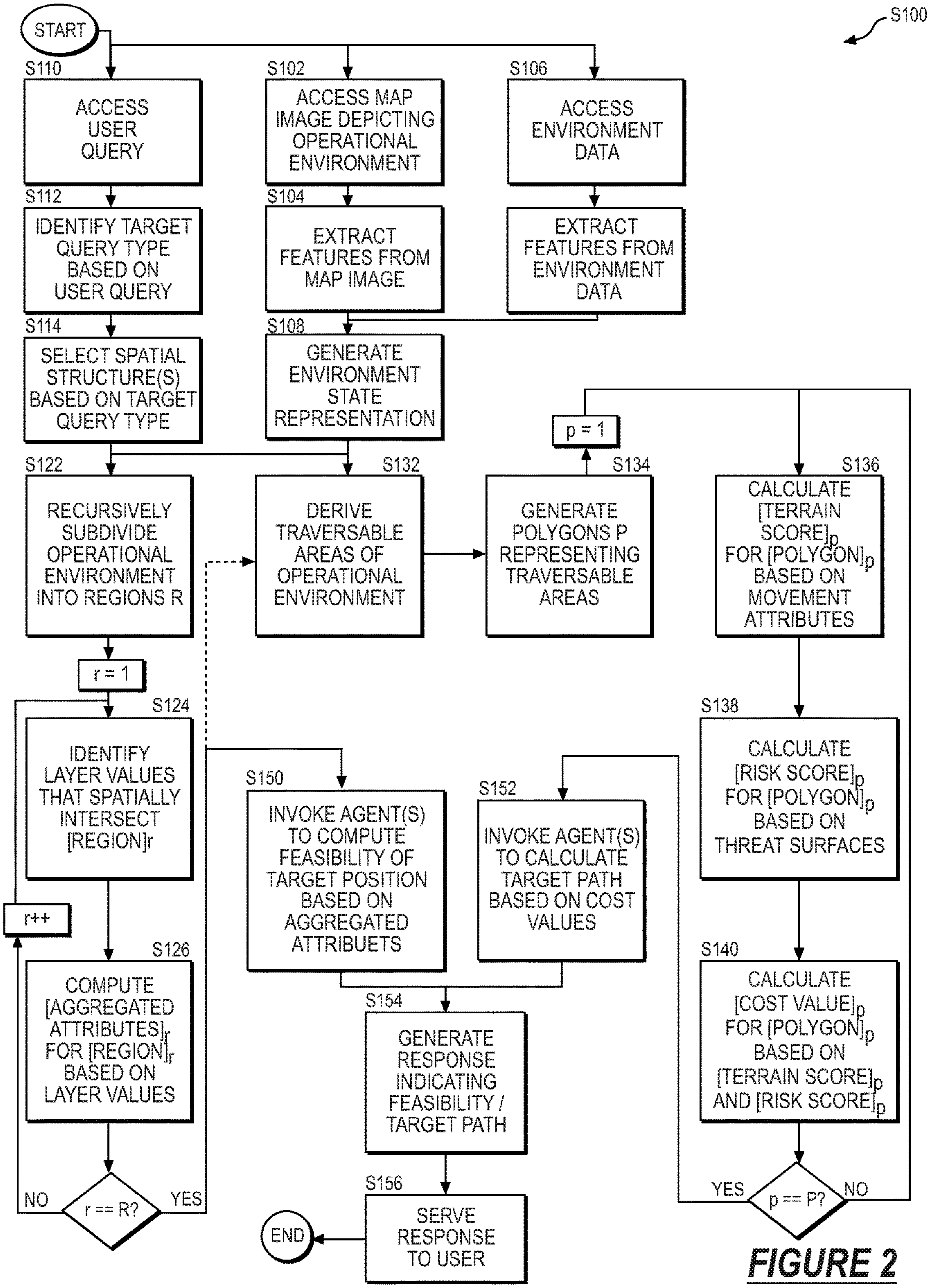
FIG. 2 is a flowchart representation of one variation of the method.

As shown in FIGS. 1 and 2, one variation of the method S100 includes: accessing an environment state representation of an operational environment in Block S108; and accessing a user query associated with a feasibility of a target position, in the operational environment, for the target entity in Block S110. The environment state representation includes a set of layers including: a first layer representing slope, elevation, and surface composition of the operational environment relative to a reference coordinate system; a second layer representing a set of roads in the operational environment relative to the reference coordinate system; and a third layer representing weather in the operational environment relative to the reference coordinate system.

This variation of the method S100 also includes generating a hierarchical spatial structure representing a set of regions in the reference coordinate system, in Block S120, by recursively subdividing the operating environment into the set of regions in Block S122. The set of regions includes a first subset of regions including the target position.

This variation of the method S100 further includes, for each region in the set of regions: identifying a subset of elements, of the set of layers, that spatially intersects the region in Block S124; and computing a set of aggregated attributes of the region based on the subset of elements in Block S126. The set of aggregated attributes characterizes traversability of the region.

This variation of the method S100 also includes: invoking an agent to compute the feasibility of the target position based on a subset of aggregated attributes of regions in the first subset of regions via traversal of the hierarchical spatial structure in Block S150; generating a response, for the user query, including a description of the feasibility of the target position in Block S154; and serving the response to a user in Block S156.

1.4 Variation: Query Response Based on Spatial Structures+Weather Effects

As shown in FIGS. 1 and 2, one variation of the method S100 includes: accessing an environment state representation of an operational environment in Block S108; and accessing a user query associated with a target position, in the operational environment, for a target entity in Block S110. The environment state representation includes a set of layers including: a first layer representing slope, elevation, and surface composition of the operational environment relative to a reference coordinate system; a second layer representing a set of roads in the operational environment relative to the reference coordinate system; and a third layer representing weather in the operational environment relative to the reference coordinate system.

This variation of the method S100 also includes: generating a hierarchical spatial structure representing a set of regions in the reference coordinate system in Block S120; and generating the navigation mesh structure including a set of polygons based on the set of layers in Block S130. Each region, in the set of regions, is characterized by a set of aggregated attributes characterizing traversability of the region based on elements, of layers in the set of layers, that spatially intersect the region. The set of polygons: represents a set of areas, in the operational environment and relative to the reference coordinate system, traversable by the target entity according to the hierarchical spatial structure; and is connected by a set of edges representing thoroughfares between adjacent polygons and accessible by the target entity. Each polygon, in the set of polygons, is characterized by: a set of movement attributes; and a cost value, in a set of cost values, based on the set of movement attributes.

This variation of the method S100 further includes: invoking a set of agents to calculate a target path, from an initial polygon containing an initial position occupied by the target entity to a target polygon containing the target position via the set of polygons, based on the set of cost values in Block S152; generating a response, for the user query, indicating the target path in Block S154; and serving the response to a user in Block S156.

1.5 Variation: Route Planning Based on Threat Effects

As shown in FIGS. 1 and 2, one variation of the method S100 includes: accessing an environment state representation of an operational environment in Block S108; and accessing a user query associated with a target position, in the operational environment, for a target entity in Block S110. The environment state representation includes a set of layers including: a first layer representing slope, elevation, and surface composition of the area of operations relative to a reference coordinate system; a second layer representing a set of roads in the operational environment relative to the reference coordinate system; a third layer representing weather in the operational environment relative to the reference coordinate system; and a fourth layer including a set of surfaces, in the reference coordinate system, representing threat effects of weapons systems of a set of threat entities occupying positions in the operational environment.

This variation of the method S100 includes generating a navigation mesh structure based on the set of layers, in Block S130, by: deriving a set of areas, in the operational environment and relative to the reference coordinate system, traversable by the target entity in Block S132; and generating a set of polygons representing the set of areas and connected by a set of edges in Block S134. Each polygon is characterized by a set of movement attributes. The set of edges represents thoroughfares between adjacent polygons and accessible by the target entity.

This variation of the method S100 further includes, for each polygon in the set of polygons, calculating a cost value, in a set of cost values, for the polygon based on: the set of movement attributes; and intersection between the polygon and surfaces in the set of surfaces in Block S140.

This variation of the method S100 also includes: invoking a set of agents to calculate a target path, from an initial polygon containing an initial position occupied by the target entity to a target polygon containing the target position via the set of polygons, based on the set of cost values in Block S152; generating a response, for the user query, indicating the target path in Block S154; and serving the response to a user in Block S156.

2. Applications

Generally, a computer system (hereinafter "the system")—including and/or interfacing with a set of autonomous agents (hereinafter "agents") and/or a model(s) (e.g., a large language model, a vision-language model, a multimodality model, a reinforcement learning model)—can execute Blocks of the method S100: to compile heterogeneous information about an operational environment into an environment state representation that represents a canonical, spatially-indexed representation of the operational environment; to derive spatial structures (or "spatial data structures") that abstract and/or transform data from the environment state representation according to different reasoning tasks; and invoke agents to reason over these spatial structures to generate responses to user queries, plans, and/or simulations.

Therefore, the system can enable agents to reason over the spatial structure(s) in order to evaluate feasibility or suitability, generate courses of action for a mission, and/or simulate execution of these courses of action without repeatedly processing raw environment data, thereby increasing computational efficiency and/or reducing response time.

More specifically, the system can execute Blocks of the method S100: to aggregate fragmented data associated with the operational environment from different sources; to normalize, correlate, and/or reconcile these fragmented data into the environment state representation including coherent, spatially-indexed layers (or "overlays") representing different aspects (e.g., slope, elevation, soil composition, weather, entity positions, threat effects) of the operational environment; and to transform these layers into spatial structures that expose these aspects of the operational environment at different levels of abstraction for execution of specific reasoning tasks.

In one example, the system executes Blocks of the method S100 to derive a hierarchical spatial structure (e.g., a quadtree structure) by: recursively subdividing the operating environment into regions; and aggregating values of layers of the environment state representation into characteristics (e.g., average slope, primary surface type, presence of threat) for each of these regions in order to represent sections of the operating environment at multiple spatial resolutions, thereby enabling agents to selectively traverse the hierarchical spatial structure in order to identify candidate locations or corridors for further analysis or movement modeling.

In another example, the system executes Blocks of the method S100 to generate a navigation mesh structure representing traversable space and movement connectivity—as an abstraction of complex geometry of the operational environment—specific to constraints of an entity by: deriving a set of areas, in the operational environment, traversable by the entity; generating a set of polygons representing these areas and connected by edges (or "portals") representing thoroughfares between adjacent polygons and accessible by the entity; and calculating cost values for the set of polygons based on attributes (e.g., movement attributes, risk attributes) of polygons, thereby enabling rapid (e.g., real-time) cost characterization and/or efficient pathfinding (e.g., via an A* algorithm) specific to the entity.

Accordingly, by deriving the hierarchical spatial structure that summarizes traversability and generating the navigation mesh to model movement connectivity and cost, the system enables agents to efficiently calculate feasible movement paths for a target entity without repeatedly evaluating raw environment data, thereby increasing computational efficiency and/or reducing response time.

2.1 Course of Action Generation+Simulation

Furthermore, the system can execute Blocks of the method S100: to ingest a set of information (e.g., documents, manuals, statements) representing a framework of standardized doctrine and practitioner-informed procedures for developing and evaluating courses of action according to operations data for a mission; and to represent this framework as a task graph (e.g., a directed graph) of nodes including instructions and/or prompts executable by an agent(s) in cooperation with the model(s) and data (e.g., text-based data, map-based data, image-based data) to mimic decisions and/or actions of the framework—such as in accordance with a selected practitioner persona (e.g., a military commander, an intelligence officer, a chief of fires, a sustainment officer)—in order to generate new courses of action according to constraints of a target mission.

For example, the system can execute Blocks of the method S100 to define the task graph including nodes representing: a military (or other service or nation) decision making process; a rapid decision making process; a deliberate decision making process; mission analysis (e.g., defining an operating environment, identifying environmental effects on operations, evaluating threats, identifying threat courses of action); developing courses of action according to mission analysis; course of action evaluation (e.g., wargaming simulation); and/or course of action comparison; etc.

The system can then execute Blocks of the method S100: to receive real-time data (e.g., via an application programming interface) and/or an operations order for the target mission from a user; to extract characteristics of the target mission from the operations order, such as an area of operations, an objective (e.g., advancement of an operational unit from an initial position to a target position in the area of operations) or purpose of the target mission, an indication of a threat (e.g., an adversary) within the area of operations, etc.; based on these characteristics, to access location data (e.g., road maps, topographical maps, real-time images) for the area of operations, threat data (e.g., threat intelligence) for the threat, real-time weather data, etc.; to dispatch the agents and/or a language model to generate courses of action for the target mission based on the location data, the threat data, and the weather data according to nodes in the task graph; to simulate execution of these courses of action for the target mission via a set of agents and the language model; to generate a visualization indicating statistics (or tradeoffs)—such as a likelihood of achieving the objective, a mission duration, a quantity of casualties incurred, an amount of fuel expended, a quantity of ammunition expended, and/or a risk score, etc.—for each course of action based on simulation of the course of action; and to serve the visualization to the user.

More specifically, the system can execute Blocks of the method S100: to access (or generate) a combination of spatial structures (e.g., a hierarchical spatial structure, a navigation mesh structure) representing task-specific abstractions of the area of operations; to invoke an agent(s) to reason over the combination of spatial structures in order to generate a course(s) of action for the mission according to the characteristics of the mission; and to invoke the set of agents to simulate execution of the course(s) of action by reasoning over the combination of spatial structures.

Accordingly, rather than assigning many (e.g., 10, 100) human personnel to manually develop and evaluate one course of action (or a few courses of action) for a mission over a period of days or weeks, the system—operable by a single human user—can: access real-time data associated with the mission; autonomously generate many (e.g., hundreds of, thousands of) courses of action for the mission within minutes (or hours) based on the real-time data; simulate execution of these courses of action—such as via turn-by-turn wargame simulations executed by autonomous agents based on real-world data (e.g., real-time data) associated with the location defined in the operations order and/or historical (or doctrinal) actions of partners and enemies—to derive empirical results and tradeoffs of each course of action; and to expose these results and tradeoffs to the user.

Therefore, the system can reduce a duration of time and/or an amount of manual effort for developing and evaluating a course of action for a mission; greatly increase a quantity of courses of action generated and evaluated for the mission, including exploration of edge cases or unorthodox options that may not be conceivable by human personnel due to various constraints (e.g., workforce constraints, time constraints, mental constraints, experience constraints); and/or report effects (e.g., results, tradeoffs) for each course of action at a finer granularity, thereby augmenting the user—such as a person with limited experience in course of action development and/or decision making —with critical information in order to accelerate and improve decision making for the mission.

More specifically, by reducing the duration of time and/or the amount of manual effort for developing and evaluating the course of action for the mission, the system can integrate real-time data (e.g., intelligence data, targeting data)—representing dynamic changes to the operating environment (e.g., troop movements, weather conditions, destroyed buildings, collapsed bridges)—into new or updated courses of action for the mission (e.g., month-long campaigns, day-to-day operations) in order to increase availability and accuracy of options (and tradeoffs for these options) for the user.

2.2 Variations: Other Domains

As described herein, the system executes Blocks of the method S100 to generate and simulate execution of courses of action for a land-based mission.

However, the system can similarly execute Blocks of the method S100 to generate and simulate courses of action for a mission conducted in any other domain (e.g., air, sea, space, cyber) or combination of domains.

3. Environment State Representation

Block S108 of the method S100 recites accessing an environment state representation of an operational environment.

Generally—in Blocks S102, S104, S106, and S108—the system can: access a map image(s) depicting an operational environment; extract features of the operational environment from the map image; access datasets, generated by various data sources, indicating observations (or measurements) associated with the operational environment; fuse these observations with the features of the operational environment from the map image; and generate an environment state representation including a set of layers representing different aspects of the operational environment.

For example, the system can generate the set of layers representing: topography (e.g., shape, slope, elevation) of the operational environment; surface composition (e.g., soil composition) of the operational environment; weather conditions in the operational environment; infrastructure (e.g., roads, bridges, buildings, structures) in the operational environment; entities (e.g., friendly entities, threat entities) in the operational environment; and/or threat effects of weapons systems of threat entities occupying positions in the operational environment; etc.

Therefore, the system can: aggregate fragmented data associated with an environment from different sources; and transform these fragmented data into a single, canonical representation of the environment including coherent, spatially-indexed layers representing different aspects of the environment, thereby enabling the system to expose the canonical representation—and/or multiple spatial structures based on this canonical representation—to agents and/or language models in order to reason, plan, and/or simulate.

3.1 Feature Extraction+Environment State Representation Generation

In one implementation, the system: accesses a map image depicting an operational environment in Block S102; and extracts a first set of features from the map image in Block S104.

More specifically, the system can: access the map image (e.g., a planimetric map, a topographic map) depicting natural features (e.g., rivers, dense forest, swamps, valleys, mountains), and man-made features (e.g., roads, tunnels, bridges, subways, buildings, airfields), etc.; and extract the first set of features including the natural features and the man-made features.

For example, the system can extract the first set of features including: a set of roads in the operational environment; a set of buildings in the operational environment; and a set of entities (e.g., a vehicle, a platoon, a brigade, a supply convoy) in the operational environment.

In this example, the system can extract the set of entities including: a set of friendly entities (e.g., a target entity); a set of threat entities; and/or a set of neutral entities; etc.

In another implementation, in Block S106, the system accesses a set of environment data representing: topography of the operational environment; surface composition in the operational environment; and/or weather in the operational environment; etc.

For example, the system can access the set of environment data including: a terrain dataset (e.g., a digital elevation model) representing shape, slope, and elevation in the operational environment; a soil dataset representing soil composition in the operational environment; and a weather dataset representing weather (e.g., current weather, forecast weather) in the operational environment.

Additionally, the system can access the set of environment data including: an infrastructure dataset representing roads and/or buildings in the operational environment; and/or intelligence reports indicating threat entities in the operational environment; etc.

In another implementation, in Block S108, the system generates the environment state representation of the operational environment based on the map image and the set of environment data.

More specifically, the system can execute similar methods and techniques to extract a second set of features (e.g., natural features, man-made features, weather, entities) from the set of environment data. The system can then generate the environment state representation based on a combination of the first set of features of the map image and the second set of features of the set of environment data.

In this implementation, the system generates the environment state representation including a set of layers (or "overlays") representing aspects of the operational environment relative to a reference coordinate system (and/or a reference time interval).

For example, the system can generate the set of layers including: a terrain layer representing slope, elevation, and surface composition of the operational environment relative to the reference coordinate system; an infrastructure layer representing a set of roads (or bridges, tunnels, airstrips, etc.) in the operational environment relative to the reference coordinate system; a weather layer representing weather relative to the reference coordinate system; and an entity layer representing the set of entities in the operational environment relative to the reference coordinate system; etc.

In this example, the system can generate the entity layer representing: positions, in the reference coordinate system, occupied by entities in the set of entities; identities of entities in the set of entities; and/or characteristics (or capabilities) of entities in the set of entities; etc.

Accordingly, the system can fuse features—derived from map images and disparate datasets—into a canonical representation of the operational environment including coherent, spatially-indexed layers representing different aspects of the operational environment.

3.1 Entity Resolution

In one implementation, the system: accesses a first set of data indicating presence of a first entity at a first position in the operational environment; accesses a second set of data indicating presence of a second entity at a second position in the operational environment; detects the first entity occupying the first position and characterized by a first set of attributes based on the first set of data; and detects the second entity occupying the second position and characterized by a second set of attributes based on the second set of data.

In this implementation, the system: detects correspondence between the first set of attributes and the second set of attributes; identifies the first entity and the second entity as corresponding to a common entity (e.g., a same entity); and generates the entity layer representing the common entity based on canonicality, confidence, and/or recency of the first set of data and the second set of data.

For example, the system can access a map image—generated at a first time—indicating presence of a first threat entity at a first position in the operational environment. Based on the map image, the system can detect the first threat entity: characterized by a first set of attributes (e.g., a first entity identifier of "C-1504"); and occupying the first position.

In this example, the system can access a set of intelligence data—generated at a second time succeeding the first time—indicating presence of a second threat entity at a second position in the operational environment. Based on the set of threat intelligence, the system can detect the second threat entity: characterized by a second set of attributes (e.g., a second entity identifier of "Charlie 1504"); and occupying the second position in the operational environment.

In this example, the system can detect correspondence between the first set of attributes and the second set of attributes (e.g., correspondence between the first entity identifier and the second entity identifier). More specifically, the system can: normalize the first entity identifier into a first normalized entity identifier (e.g., "C-1504"); normalize the second entity identifier into a second normalized entity identifier (e.g., "C-1504"); and detect correspondence between the first normalized entity identifier and the second normalized entity identifier.

In response to correspondence between the first set of attributes and the second set of attributes, the system can: identify the second threat entity as corresponding to the first threat entity; select the second position—rather than the first position—as an estimated position of the first threat entity based on recency of the set of intelligence data relative to the map image; and generate the entity layer representing the set of entities including the first threat entity occupying the second position relative to the reference coordinate system based on recency of the set of intelligence data relative to the map image.

Additionally, or alternatively, the system can: calculate a first confidence score of the map image representing certainty of presence of the first threat unit at the first position (at a target time); calculate a second confidence score of the set of intelligence data representing certainty of presence of the second threat unit at the second position (at the target time); and select the second position—rather than the first position—as the estimated position of the first threat entity in response to the second confidence score exceeding the first confidence score.

Accordingly, the system can correlate and resolve (potentially conflicting) data (or observations) indicating presence (or characteristics) of entities in the operational environment based on recency, confidence, and/or canonicality of these data.

The system can execute similar methods and techniques to correlate and resolve data indicating presence (or characteristics) of other features in the operational environment, such as terrain, infrastructure, weather, etc.

3.2 User-Generated Data

In one variation, the system: accesses a user input defining features of the operational environment; and generates the environment state representation based on the user input.

In one example, the system accesses a user input defining: an initial position, in the operational environment, occupied by a target entity; and a first position, in the operational environment, occupied by a threat entity.

In this example, the system: accesses a first map image depicting a set of roads in the operational environment; and generates a second map image—based on the first map image and depicting the operational environment—indicating the target entity at the initial position and the threat entity at the first position. The system can then execute the foregoing methods and techniques: to extract a set of features—from the second map image—including the set of roads and a set of entities including the target entity and the threat entity; and to generate the environment state representation including an entity layer representing the target entity at the initial position in the reference coordinate system and the threat entity at the first position in the reference coordinate system.

In another example, the system: accesses a user input representing a rain intensity (e.g., absence of rain, light rain intensity, moderate rain intensity, heavy rain intensity) in the operational environment; and generates the environment state representation including a weather layer representing weather in the operational environment based on the user input.

Accordingly, the system can enable the user to modify features of the operational environment derived from available datasets and/or to define features of the operational environment absent from the available datasets.

3.3 Threat Surface Layer

In one implementation, the system generates the set of layers including a threat surface layer representing threat effects of weapons systems of threat entities occupying positions in the operational environment.

More specifically, the system can generate the threat surface layer including a set of surfaces, in the reference coordinate system, representing threat effects of weapons systems of the set of threat entities occupying positions in the operational environment.

For example, for a first threat entity occupying a first position in the operational environment, the system can calculate a first surface, in the set of surfaces, representing threat effects of a first weapons system of the first threat entity based on: topography of the operational environment according to the topography layer; the first position relative to the reference coordinate system according to the entity layer; and a first range of the weapons system.

The system can repeat the foregoing methods and techniques for each weapons system of the first threat entity to calculate a surface, in the set of surfaces, representing threat effects of the weapons system of the first threat entity.

Additionally, the system can repeat the foregoing methods and techniques for each entity (e.g., threat entity) in the set of entities to calculate surfaces, in the set of surfaces, representing (threat) effects of weapons system of the entity.

Therefore, the system can characterize risk, in the operational environment, from threat effects of weapons systems of threat entities based on the set of surfaces.

4. Spatial Structures

Block S120 of the method S100 recites generating a hierarchical spatial structure representing a set of regions in the reference coordinate system. Each region, in the set of regions, is characterized by a set of aggregated attributes characterizing traversability of the region based on elements, of layers in the set of layers, that spatially intersect the region.

Block S130 of the method S100 recites, based on the set of layers, generating the navigation mesh structure including a set of polygons: representing a set of areas, in the operational environment and relative to the reference coordinate system, traversable by the target entity according to the hierarchical spatial structure; and connected by a set of edges representing thoroughfares between adjacent polygons and accessible by the target entity.

Generally—in Blocks S120, S122, S124, S126, S130, S132, S134, S136, S138, and S140—the system can generate a spatial structure (e.g., a hierarchical spatial structure, a navigation mesh structure) by: defining a set of spatial elements (e.g., regions, polygons) relative to the reference coordinate system; projecting a subset of values of layers, in the set of layers, onto the set of spatial elements; and, for each spatial element in the set of spatial elements, deriving a set of structure-specific attributes based on the subset of values. The system can store the spatial structure in memory.

Accordingly, the system can transform layers of the environment state representation into a task-specific abstraction of these layers that bounds computational complexity and preserves uncertainty while enabling the environment state representation to be updated independently based on availability of new information.

Therefore, the system can enable agents to reason over the spatial structure(s) in order to evaluate feasibility, generate courses of action, and/or simulate execution of these courses of action without repeatedly processing raw environment data, thereby increasing computational efficiency and/or reducing response time.

4.1 Hierarchical Spatial Structure

In one implementation, in Block S120, the system generates a hierarchical spatial structure (e.g., a quadtree structure) representing a set of regions in the reference coordinate system. Each region, in the set of regions, is characterized by a set of aggregated attributes—characterizing accessibility, traversability, and/or risk, etc. of the region—based on elements, of layers in the set of layers, that spatially intersect the region.

More specifically, the system can recursively subdivide the operating environment into the set of regions in Block S122. In particular the system: initializes a root region, in the set of regions, representing the operating environment (or an area of interest within the operating environment); and partitions the root region into a first set of (e.g., four) child regions in the set of regions. The system repeats the foregoing methods and techniques for each region in the first set of child regions to recursively subdivide the region into child regions in the set of regions.

For each region in the set of regions, the system can: identify a subset of elements, of the set of layers, that spatially intersect the region in Block S124; and compute a set of aggregated attributes of the region based on the subset of elements in Block S126.

The set of aggregated attributes can represent: slope (e.g., maximum slope, average slope, minimum slope) within the region; a primary surface type in the region; surface strength of the primary surface type; a traversability indicator (e.g., traversable, non-traversable); maximum threat intensity in the region; aggregate risk score for the region; a threat indicator (e.g., presence of threat, absence of threat); rain intensity affecting the region; a surface degradation factor due to weather effects; effective traversability (or "environment-modified traversability") in the region according to weather effects; etc.

Accordingly, the system can derive a hierarchical spatial structure that aggregates values of layers—of the environment state representation—at multiple spatial resolutions, thereby enabling agents to selectively traverse the hierarchical spatial structure in order to identify candidate locations or corridors for further analysis or movement modeling.

4.1.1 Example: Traversability Attribute

In one example, for a first region in the set of regions, the system: selects a first subset of layers (e.g., the terrain layer, the weather layer) in the set of layers; and identifies a first subset of elements, of the first subset of layers, that spatially intersects the first region. Based on the first subset of elements, the system: derives a first attribute, in a first set of aggregated attributes of the first region, representing soil strength of the first region; derives a second attribute, in the first set of aggregated attributes, representing slope (e.g., average slope) of the first region; and derives a third attribute, in the first set of aggregated attributes, representing surface degradation in the first region according to weather effects (e.g., rain intensity in the region).

In this example, the system derives a fourth attribute, in the first set of aggregated attributes, representing effective traversability of the first region based on: the first attribute; the second attribute; and/or the third attribute.

4.1.2 Example: Threat Indicator Attribute

In another example, for a first region in the set of regions, the system: selects a second subset of layers (e.g., the terrain layer, the entity layer, the threat surface layer) in the set of layers; and identifies a first subset of elements, of the first subset of layers, that spatially intersects the first region. Based on the first subset of elements, the system derives a first attribute, in a first set of aggregated attributes of the first region, representing absence of threat effects from threat entities in response to the first region falling outside of the surfaces in the set of surfaces of the threat layer.

More specifically, the system can derive the first attribute representing absence of threat effects from threat entities in response to absence of surfaces, in the set of surfaces, in the first subset of elements of the threat surface layer that spatially intersect the first region.

Additionally, the system can derive a second attribute (e.g., a risk score), in the first set of aggregated attributes, representing risk in the region based on surfaces, in the set of surfaces, intersecting the first region; canalization in the polygon; observability from the region; cover and/or concealment in the region; etc.

4.2 Navigation Mesh Structure

Generally—in Blocks S130, S132, S134, S136, S138, and S140—the system can generate a navigation mesh structure based on the set of layers of the environment state representation. The navigation mesh structure includes a set of polygons (e.g., convex polygons) (or other shapes): representing a set of areas, in the operational environment and relative to the reference coordinate system, traversable by a target entity; and connected by a set of edges (or "portals") representing thoroughfares (e.g., roads, pathways, high-speed avenues of approach)—between adjacent polygons and accessible by the target entity—in the operational environment.

In one implementation, the system derives a set of areas, in the operational environment and relative to the reference coordinate system, traversable by the target entity according to the hierarchical spatial structure in Block S132.

More specifically, the system can: identify a subset of regions, in the set of regions of the hierarchical spatial structure, traversable by the target entity based on sets of aggregated attributes of the set of regions; and derive the set of areas corresponding to the subset of regions.

In one implementation, in Block S134, the system generates a set of polygons: representing the set of areas; and connected by a set of edges representing thoroughfares between adjacent polygons and accessible by the target entity. Each polygon, in the set of polygons, is characterized by a set of movement attributes.

More specifically, the system can: characterize (or calculate) the set of movement attributes (e.g., slope, elevation, terrain type, soil type, rain intensity, obstacles) for each polygon in the set of polygons based on the set of layers; access (or identify) a set of accessibility constraints (e.g., maximum slope angle, minimum road width, obstacle clearance height, passable terrain types) of the target entity; and define the set of edges based on the set of accessibility constraints and sets of movement attributes of polygons in the set of polygons.

For example—for a pair of polygons, in the set of polygons, including a first polygon and a second polygon—the system can: access a first set of movement attributes of the first polygon; and access a second set of movement attributes of the second polygon.

In this example—based on the set of accessibility constraints of the target entity, the first set of attributes, and/or the second set of attributes—the system can: detect that the first polygon can be occupied by the target entity; detect that the second polygon can be occupied by the target entity; detect that the first polygon is accessible from the second polygon; and detect that the second polygon is accessible from the first polygon. The system then can define a first edge (or a target "portal"), in the set of edges, connecting the first polygon and the second polygon.

The system repeats the foregoing methods and techniques for pairs of polygons in the set of polygons to define the set of edges.

Therefore, the system can generate the navigation mesh structure representing traversable space and movement connectivity—as an abstraction of complex geometry of the operational environment—specific to constraints of the target entity, thereby enabling rapid (e.g., real-time) cost characterization and/or efficient pathfinding specific to the target entity.

4.2.1 Terrain Scores

In another implementation, in Block S136, the system calculates a set of terrain scores for the set of polygons based on sets of movement attributes of the set of polygons.

More specifically, the system can: access a set of movement attributes for a polygon in the set of polygons; and calculate (or assign) a terrain score to the polygon based on the set of movement attributes. In particular, the system calculates the terrain score for a polygon proportional to a difficulty for the target unit to occupy (or access) the polygon based on the set of movement attributes of the polygon.

In another example, the system: accesses a first set of movement attributes (e.g., zero degree slope, asphalt road, light rain intensity) for a first polygon; and calculates a first terrain score (e.g., "0") for the first polygon based on the first set of movement attributes.

In another example, the system: accesses a second set of movement attributes (e.g., 60 degree slope, dirt path, a first soil type, light rain intensity) for a second polygon; and calculates a second terrain score (e.g., "10") for the second polygon based on the second set of movement attributes. The second terrain score exceeds the first terrain score.

In another example, the system: accesses a third set of movement attributes (e.g., swamp, heavy rain intensity) for a third polygon; and calculates a third terrain score (e.g., "50") for the third polygon based on the third set of movement attributes. The third terrain score exceeds the first terrain score and the second terrain score.

4.2.2 Risk Scores

In one implementation, in Block S138, the system calculates a set of risk scores for the set of polygons based on the threat surface layer including a set of surfaces, in the reference coordinate system, representing threat effects of weapons systems of threat entities occupying positions in the operational environment.

More specifically, the system can access the set of surfaces of the threat surface layer. For each surface in the set of surfaces, the system can map the surface to polygons in the set of polygons. The system can then calculate the set of risk scores for the set of polygons based on intersection between surfaces, in the set of surfaces, and polygons in the set of polygons.

For example, the system can map a first surface in the set of surfaces to the set of polygons including: a first subset of polygons disjointed from the first surface; and a second subset of polygons intersecting (or containing) the first surface.

In this example, the system can: calculate a first risk score for each polygon in the first subset of polygons; and calculate a second risk score—exceeding the first risk score—for each polygon in the second subset of polygons based on intersection between the polygon and the first surface (e.g., based on severity of an effect of the weapons system represented by the first surface).

Additionally or alternatively, the system can calculate a risk score for a polygon based on: a combination of surfaces, in the set of surfaces, intersecting the polygon; canalization in the polygon; observability from the polygon; access and/or stability of communications in the polygon; cover and/or concealment in the polygon; etc.

4.2.3 Cost Values

In another implementation, in Block S140, the system calculates a set of cost values for the set of polygons.

More specifically, for each polygon in the set of polygons, the system can: calculate a cost value, in a set of cost values, for the polygon based on: a set of movement attributes of the polygon; and intersection between the polygon and surfaces in the set of surfaces.

For example, the system can calculate the cost value based on: the terrain score of the polygon; and the risk score of the polygon.

4.3 Other Spatial Structure

As described herein, the system executes Blocks of the method S100 to generate a hierarchical spatial structure (e.g., a quadtree)—and/or a navigation mesh structure—representing layers of an environment state representation of an operational environment.

However, the system can similarly execute Blocks of the method S100 to generate a spatial structure including other archetypes and/or formats for spatial data containers, such as a raster, a voxelized grid, and/or other data structures, etc.

5. User Query

Block S110 of the method S100 recites accessing a user query associated with a target position, in the operational environment, for a target entity.

Block S130 of the method S100 recites, based on the set of layers, generating the navigation mesh structure including a set of polygons: representing a set of areas, in the operational environment and relative to the reference coordinate system, traversable by the target entity according to the hierarchical spatial structure; and connected by a set of edges representing thoroughfares between adjacent polygons and accessible by the target entity. Each polygon in the set of polygons is characterized by: a set of movement attributes; and a cost value, in a set of cost values, based on the set of movement attributes.

The method S100 includes: invoking a set of agents to calculate a target path, from an initial polygon containing an initial position occupied by the target entity to a target polygon containing the target position via the set of polygons, based on the set of cost values in Block S152; generating a response, for the user query, indicating the target path in Block S154; and serving the response to a user in Block S156.

Generally—in Blocks S110, S112, S114, S120, S130, S150, S152, S154, and S156—the system can: access a user query associated with the operational environment; based on the user query and layers of the environment state representation, access (or generate) a combination of spatial structures (e.g., a hierarchical spatial structure, a navigation mesh structure) representing task-specific abstractions of the operational environment; and invoke an agent(s) to reason over the combination of spatial structures in order to generate and return a response to the query.

More specifically, based on layers of the environment state representation, the system can execute the foregoing methods and techniques: to generate a hierarchical spatial structure by aggregating traversability-related attributes of the operational environment into spatial regions relative to a reference coordinate system; and generate a navigation mesh structure by partitioning traversable areas of the operational environment—according to the hierarchical spatial structure—into polygons characterized by movement attributes and associated cost values. The system can then invoke the agent(s): to evaluate a feasibility of movement within the operational environment by reasoning over the hierarchical spatial structure; to calculate a movement path(s) by reasoning over the navigation mesh structure; and to generate the response to the user query based on the feasibility of movement and/or the movement path(s).

Accordingly, by deriving the hierarchical spatial structure that summarizes traversability and generating the navigation mesh to model movement connectivity and cost, the system enables agents to efficiently calculate feasible movement paths for the target entity without repeatedly evaluating raw environment data, thereby increasing computational efficiency and/or reducing response time.

5.1 Query Reception+Spatial Structure Selection

In one implementation, the system: accesses a user query associated with a target position, in the operational environment, for a target entity in Block S110; identifies a target query type—in a set of query types—of the user query based on language signals in the user query in Block S112; and selects a target combination of spatial structures based on the target query type in Block S114. The set of query types can include: a feasibility query type; a suitability query type; a route-selection query type; a planning query type; a simulation query type; and/or an explanation query type; etc. Each query type, in the set of query types, can correspond to a distinct combination of spatial structures.

In this implementation, the system executes the foregoing methods and techniques to generate the target combination of spatial structures.

Alternatively, in response to detecting presence of (e.g., stored in memory) a spatial structure in the target combination of spatial structures, the system can access (or retrieve) the spatial structure rather than generate the spatial structure.

For example, the system can: access a user query (e.g., "can my vehicle advance to Point X-ray?") associated with a feasibility of the target position, in the operational environment, for the target entity; identify the feasibility query type of the user query based on language signals in the user query; and select a first combination of spatial structures—including a hierarchical spatial structure (e.g., a quadtree structure) and a navigation mesh structure—based on the feasibility query type.

In this example, the system can generate the hierarchical spatial structure representing a set of regions in the reference coordinate system. Each region, in the set of regions, is characterized by a set of aggregated attributes—characterizing accessibility, traversability, and/or risk, etc. of the region—based on elements, of layers in the set of layers, that spatially intersect the region. The set of regions includes a first subset of regions containing the target position.

In response to generating the hierarchical spatial structure, the system can: identify a second subset of regions, in the set of regions, traversable by the target entity based on sets of aggregated attributes of the set of regions; and derive a set of areas, in the operational environment and relative to the reference coordinate system, traversable by the target entity corresponding to the second subset of regions.

In this example, the system can generate the navigation mesh structure including a set of polygons: representing the set of areas; and connected by a set of edges representing thoroughfares between adjacent polygons and accessible by the target entity. Each polygon, in the set of polygons, is characterized by: a terrain score; a risk score; and a cost value based on the terrain score and the risk score.

Accordingly, by generating the hierarchical spatial structure prior to generating the navigation mesh structure, the system can evaluate traversability at coarse spatial resolution in order to: identify a subset of regions of the operational environment that is feasible for movement by the target entity based on aggregated attributes of the hierarchical spatial structure; and restrict generation of the navigation mesh structure to this subset of regions in order to proactively exclude (or "prune") infeasible regions of the operational environment, thereby reducing size and complexity of the navigation mesh structure.

5.2 Agentic Reasoning

Generally—in Blocks S150, S152, S154, and S156—the system can: invoke a set of agents to reason over spatial structures and to generate a response to the user query; and serve the response to a user.

More specifically, the system can access (or generate) a task graph (e.g., a directed graph) including a set of nodes representing a sequence of tasks (e.g., an ordered set of reasoning tasks) for generating a response to the user query. Each node, in the set of nodes, contains logic defining behavior for executing a task in the sequence of tasks. The system can invoke the set of nodes to reason over spatial structures and to generate a response to the user query via execution of nodes in the set of nodes.

For example, the set of tasks can include: parsing a query; selecting a combination of spatial structures—such as a hierarchical spatial structure and a navigation mesh structure—for the query; extracting region summaries from the hierarchical spatial structure; computing feasible candidate routes according to the navigation mesh structure; evaluating the region summaries and the candidate routes; and synthesizing a response based on evaluation of the region summaries and the candidate routes. The response can include: an explanation; and/or map annotations; etc.

In one implementation, the system ingests a set of documents representing: guidelines for executing (or performing) reasoning tasks associated with a mission; and/or procedures for generating a course of action based on operations data. The system stores the set of documents in a data repository.

In one example, the system: accesses a set of military manuals (and/or unit standard operating procedures) representing doctrine for executing reasoning tasks and/or developing a course of action according to operations data for a mission; and stores the set of military manuals in the data repository.

In another example, the system: accesses a set of information-such as a written statement or an audio recording of an interview with a practitioner (e.g., a military commander, an intelligence officer, a chief of fires, a sustainment officer)—representing a practitioner-informed experiential framework for executing reasoning tasks and/or developing a course of action according to operations data for a mission; generates a structured document(s) (e.g., a structured summary) based on the set of information; and stores the structured document(s) in the data repository.

In another implementation, in Block S154, the system invokes the set of agents to generate a response to the user query by reasoning over spatial structures via execution of nodes, in the set of nodes, according to the set of documents.

For example, the system can access (or generate) a directed graph including a set of nodes, each node representing a task (e.g., a decision, an action) in a sequence of tasks. Each node, in the set of nodes, represents a set of instructions and/or a prompt(s) for execution (or resolution) of a task by the agent and/or the model according to the set of documents.

In this example, the system can invoke the set of agents to generate the response to the user query via execution of nodes according to a selected practitioner persona (or practitioner role) in a set of practitioner personas including: a military commander; an intelligence officer; a chief of fires; a sustainment officer; and/or a special operations commander; etc.

In this implementation, the system serves the response to the user in Block S156.

Accordingly, by invoking the set of agents to execute nodes according to the set of documents and/or the selected practitioner persona, the system can guide execution of these nodes to constrain, parameterize, and/or sequence reasoning tasks over spatial structures in order to generate the response that reflects mission-specific doctrine and/or practitioner-informed reasoning.

5.2.1 Feasibility

In one implementation, the system executes the foregoing methods and techniques to access the user query associated with a feasibility of a target position, in the operational environment, for the target entity.

In this implementation, in Block S150, the system invokes a set of agents to compute the feasibility of the target position—by executing nodes in the set of nodes (e.g., according to a selected practitioner persona)—via traversal of the hierarchical spatial structure.

More specifically, the system can invoke the set of agents to compute the feasibility of the target position by traversing the hierarchical spatial structure from the root region toward a subset of regions (e.g., child regions), in the set of regions, associated with (e.g., containing) the target position. For each region in the subset of regions, the system can invoke the set of agents: to evaluate a subset of aggregated attributes of the region associated with feasibility of the target position for the target entity; and to compute the feasibility of the target position based on the subset of aggregated attributes.

For example, the system can access a set of feasibility constraints, of the target entity, including: a threshold slope angle; a threshold effective traversability value; and/or a threshold risk score; etc. The set of feasibility constraints can be specific to the selected practitioner persona. Each practitioner persona, in the set of practitioner personas, can be associated with a distinct set of feasibility constraints.

In this example, for a first region in the subset of regions, the system can access a first subset of aggregated attributes of the first region. The first subset of aggregated attributes can include: a first attribute representing maximum slope in the first region; a second attribute representing effective traversability in the first region; and a third attribute representing aggregate risk (e.g., an aggregate risk score) in the first region.

In response to the first subset of aggregated attributes falling within the set of feasibility constraints, of the target entity, the system can detect that the target position is feasible for the target entity based on the first region.

The system repeats the foregoing methods and techniques for each region in the subset of regions. In response to detecting that the target position is feasible for the target entity based on each region in the subset of regions, the system can compute the feasibility of the target position as feasible.

Alternatively, in response to an aggregated attribute—of a region (e.g., the first region) in the subset of regions—falling outside of the set of feasibility constraints of the target entity, the system can: detect that the target position is infeasible for the target entity based on the region; and compute the feasibility of the target position as infeasible.

In another implementation, the system: generates a response, for the use query, including a description of the feasibility of the target position in Block S154; and serves the response to the user in Block S156.

More specifically, in response to computing the feasibility of the target position, the system can: invoke the set of agents and/or the model to generate a description of the feasibility of the target position based on the set of feasibility constraints, subsets of aggregated attributes of regions of the hierarchical spatial structure, and traversal of the hierarchical spatial structure; generate the response including the description of the feasibility of the target position; and serve the response to the user.

5.2.2 Target Path

In another implementation, in Block S152, the system invokes the set of agents to calculate a target path—from an initial polygon, containing an initial position occupied by the target entity, to a target polygon containing the target position via the set of polygons of the navigation mesh structure—for the target entity based on the set of cost values.

More specifically, the system can invoke the set of agents to identify (or calculate) a set of paths from the initial polygon to the target polygon via the set of polygons (e.g., via edges connecting polygons in the set of polygons). Each path, in the set of paths, is: associated with a group of polygons in the set of polygons; and characterized by a cost score, in a set of cost scores, based on cost values of polygons in the group of polygons. The system can then: for each path in the set of paths, calculate the cost score based on cost values of polygons in the group of polygons; and select the target path, in the set of paths, characterized by a lowest cost score in the set of cost scores.

In another implementation, the system: generates a response, for the use query, indicating the target path in Block S154; and serves the response to the user in Block S156.

For example, the system can: generate a map image of the operational environment; indicate (or overlay) the target path on the map image; generate the response including the map image; and serve the response to the user.

5.3 Example: Feasibility+Time-varying Weather

In one example, the system: accesses a first set of weather data representing weather in the operational environment for a first time interval (e.g., a current time) in a set of time intervals; accesses a second set of weather data (e.g., one hour succeeding the current time) representing weather in the operational environment for a second time interval in the set of time intervals; and generates the set of layers of the environment state representation representing weather relative to the reference coordinate system for the set of time intervals based on the first set of weather data and the second set of weather data.

More specifically, the system can: generate a first weather layer, in the set of layers, representing weather relative to the reference coordinate system for the first time interval based on the first set of weather data; and generate a second weather layer, in the set of layers, representing weather relative to the reference coordinate system for the second time interval based on the second set of weather data.

In this example, the system: accesses a user query associated with a feasibility of a target position, in the operational environment, for the target entity; and generates a hierarchical spatial structure representing a set of regions relative to the operational environment.

For each time interval in the set of time intervals and based on the set of layers, the system computes aggregated attributes characterizing traversability and/or risk of each region in the set of regions of the hierarchical spatial structure.

In particular, for each region in the set of regions of the hierarchical spatial structure and based on the set of layers, the system computes: a first set of aggregated attributes characterizing traversability of the region within the first time interval; and a second set of aggregated attributes characterizing traversability of the region within the second time interval.

In this example, the system invokes the set of agents to compute the feasibility of the target position based on aggregated attributes of regions in a first subset of regions—containing the target position—via traversal of the hierarchical spatial structure.

More specifically, the system can: invoke the set of agents to compute the feasibility of the target position within the first time interval based on the first set of aggregated attributes; and invoke the set of agents to compute the feasibility of the target position within the second time interval based on the second set of aggregated attributes.

In this example, the system generates: a first description of the feasibility of the target position within the first time interval; a second description of the feasibility of the target position within the second time interval; and a response, for the user query, including the first description and the second description. The system can then serve the response to the user.

Accordingly, the system can: separately compute aggregated attributes for each region in the hierarchical spatial structure for each time interval in the set of time intervals based on corresponding layers of the environment state representation; and generate a response to the user query that reflects time-dependent feasibility of the target position by reasoning over the hierarchical spatial structure across the set of time intervals.

Therefore, the system can enable the set of agents: to evaluate feasibility as a function of changes in traversability and/or risk over time; and to generate a response indicating temporal progression, degradation, or improvement of feasibility resulting from changes in environmental conditions.

6. Course of Action Generation

The method S100 includes: accessing a set of operations data for a mission from a user in Block S116; and deriving a set of characteristics of the mission based on the set of operations data in Block S118. The set of characteristics includes: a target entity; and a target position, in an operational environment, for the target entity and representing an objective of the mission.

The method S100 includes generating a navigation mesh structure based on the set of layers, in Block S130, by: deriving a set of areas, in the operational environment and relative to the reference coordinate system, traversable by the target entity in Block S132; and generating a set of polygons representing the set of areas and connected by a set of edges representing thoroughfares between adjacent polygons and accessible by the target entity in Block S134. Each polygon is characterized by a set of movement attributes.

The method S100 includes, for each polygon in the set of polygons: calculating a terrain score, in a set of terrain scores, based on the set of movement attributes in Block S136; and calculating a risk score, in a set of risk scores, based on intersection between the polygon and surfaces in the set of surfaces in Block S138.

Block S160 of the method S100 recites invoking a set of agents to generate a first course of action for the mission by calculating a target path, from an initial polygon containing an initial position occupied by the target entity to a target polygon containing the target position via the set of polygons, based on the set of terrain scores and the set of risk scores.

The method S100 includes: generating a visualization indicating the first course of action in Block S166; and serving the visualization to the user in Block S168.

Generally—in Blocks S116, S118, S120, S130, S160, S162, S166, and S168—the system can: access operations data for a mission; derive characteristics of the mission from the operations data; based on the characteristics of the mission and layers of the environment state representation, access (or generate) a combination of spatial structures (e.g., a hierarchical spatial structure, a navigation mesh structure) representing task-specific abstractions of the operational environment; invoke an agent(s) to reason over the combination of spatial structures in order to generate a course(s) of action for the mission according to the characteristics of the mission; generate a visualization indicating the course(s) of action; and serving the visualization to the user.

More specifically, based on layers of the environment state representation, the system can execute the foregoing methods and techniques: to generate a hierarchical spatial structure by aggregating traversability-related attributes and/or risk-related attributes of the operational environment into spatial regions relative to a reference coordinate system; and to generate a navigation mesh structure by partitioning traversable areas of the operational environment—according to the hierarchical spatial structure—into polygons characterized by movement attributes, risk attributes, and associated cost values. The system can then invoke the agent(s): to evaluate a feasibility of movement and/or a risk of movement within the operational environment by reasoning over the hierarchical spatial structure; to calculate a movement path(s) by reasoning over the navigation mesh structure; and to generate the course of action(s) based on the feasibility of movement, the risk of movement, and/or the movement path(s).

Accordingly, the system can: access real-time (or near-real-time) data (e.g., location data, weather data, threat intelligence, friendly unit data, threat unit data) associated with a mission and/or an operational environment associated with the mission; generate a spatial structure(s) representing the operational environment based on the real-time data; and autonomously generate many courses of action based on the real-time data and/or the spatial structure(s).

Therefore, the system can: reduce a duration of time and/or an amount of manual effort for developing a course of action for a mission; and greatly increase a quantity of courses of action generated for the mission, including exploration of edge cases or unorthodox options.

6.1 Mission Reception

In one implementation, the system: accesses a set of operations data (e.g., an operations order, a guidance worksheet) for a mission from a user in Block S116, such as via an interface (e.g., a user interface, a programmatic interface); and derives a set of characteristics of the mission from the set of operations data in Block S118.

For example, the system (e.g., via an agent and/or the model) can derive the set of characteristics including: a purpose of the mission; a time constraint for the mission; an initial position, in the operational environment (or an "area of operations"), occupied by a target entity (e.g., a platoon, a brigade, a supply convoy); a target position, in the operational environment, for the target entity; a target end state and/or an objective(s) of the mission, such as advancement of the target entity from the initial position to the target position; an indication of friendly entities (e.g., a friendly installation) in the operational environment; an indication of threat entities (e.g., an assumed adversary unit, an adversary platoon, an adversary installation) in the operational environment; resource (e.g., ammunition, fuel) constraints; etc.

6.2 Spatial Structures

In another implementation, in Blocks S120 and S130, the system executes the foregoing methods and techniques to generate (or access) a combination of spatial structures (e.g., a hierarchical spatial structure, a navigation mesh structure) in order to generate a course of action for the mission.

More specifically, the system can execute the foregoing methods and techniques to generate the hierarchical spatial structure—representing a set of regions in the reference coordinate system—by recursively subdividing the operating environment into the set of regions (e.g., including a subset of regions containing the target position). For each region in the set of regions, the system can then: identify a subset of elements, of the set of layers of the environment state representation, that spatially intersects the region; and compute a set of aggregated attributes (e.g., traversability-related attributes, risk-related attributes) of the region based on the subset of elements, the set of aggregated attributes characterizing the region.

Additionally or alternatively, based on the set of layers, the system can execute the foregoing methods and techniques to generate the navigation mesh structure by: deriving a set of areas, in the operational environment and relative to the reference coordinate system, traversable by the target entity (e.g., according to the hierarchical spatial structure); and generating a set of polygons representing the set of areas and connected by a set of edges representing thoroughfares between adjacent polygons and accessible by the target entity. The set of polygons can include: an initial polygon containing an initial position occupied by the target entity; and a target polygon containing the target position.

For each polygon in the set of polygons, the system can execute the foregoing methods and techniques: to calculate a terrain score, in a set of terrain scores, based on a set of movement attributes of the polygon; calculate a risk score, in a set of risk scores, based on intersection between the polygon and surfaces in a set of surfaces—representing threat effects of weapons systems of threat entities occupying positions in the operational environment—of a threat surface layer in the set of layers; and to calculate a cost value, in a set of cost values, based on the terrain score and the risk score.

6.2 Agentic Reasoning

Generally, in Block S160, the system can invoke a set of agents to reason over spatial structures and to generate a course of action for the mission.

In one implementation, the system accesses (or retrieves) the set of documents representing: guidelines for executing (or performing) reasoning tasks associated with a mission; and/or procedures for generating a course of action based on operations data.

In another implementation, the system accesses (or generates) a task graph (e.g., a directed graph) including a set of nodes representing a sequence of tasks (e.g., an ordered set of reasoning tasks) for generating a course of action. Each node, in the set of nodes, contains logic-defining behavior for executing a task in the sequence of tasks based on the set of operations data and/or the set of documents.

For example, the sequence of tasks can include: assessing relative combat power; generating a set of options; arraying forces; developing a broad concept; assigning headquarters; preparing a course of action statement and/or a course of action sketch; conducting a course of action briefing; and/or selecting (or modifying) a course of action for continued analysis.

In this example, the system can access a node, in the set of nodes, representing a set of instructions and/or a prompt(s) for execution (or resolution) of a task by an agent and/or the model according to data (e.g., text-based data, map-based data, image-based data).

In another implementation, in Block S160, the system invokes the set of agents to reason over spatial structures and to generate a course of action via execution of nodes, in the set of nodes, according to the set of operations data and/or the set of documents.

In this implementation, the system invokes (or dispatches) an agent and/or the model for execution of each node in the set of nodes in order to generate a course of action based on the set of operations data and the combination of spatial structures. Additionally or alternatively, the system can invoke an agent(s) and/or the model(s) to generate the course of action based on: image data (e.g., maps, surveillance images); weather data (e.g., real-time weather data, weather forecasts); friendly areas of operation; adversary areas of operation; friendly situations; adversary situations; schemes of maneuver; and/or relative combat power; etc.

For example, the system can invoke the set of agents to generate a first course of action for the mission by calculating a target path—from the initial polygon to the target polygon via the set of polygons of the navigation mesh structure—based on the set of terrain scores, the set of risk scores, and/or the set of cost values.

More specifically, the system can invoke the set of agents to select (or identify, calculate) a set of paths from the initial polygon to the target polygon via the set of polygons (e.g., via edges connecting polygons in the set of polygons). Each path, in the set of paths, is: associated with a group of polygons in the set of polygons; and characterized by a cost score, in a set of cost scores, based on cost values of polygons in the group of polygons. The system can then: for each path in the set of paths, calculate the cost score based on cost values of polygons in the group of polygons; and select the target path, in the set of paths, characterized by a lowest cost score in the set of cost scores, such as for a first option in the set of options.

In particular, the system: calculates a first path via a first group of polygons in the set of polygons; accesses a first set of cost values for the first group of polygons; and calculates a first cost score, in the set of cost scores, based on (e.g., a sum of) the first set of cost values for the first group of polygons.

The system repeats the foregoing methods and techniques for each path, in the set of paths, to calculate a cost score for the path based on cost values of polygons in the group of polygons associated with the path.

The system can then: select a target path—in the set of paths—associated with a lowest cost score in the set of cost scores; and generate a course of action based on the target path.

In this example, the system can invoke the set of agents to generate the first course of action, including a set of actions for the target entity (and/or other entities in the set of entities) to achieve, occupy, influence, and/or exploit a target objective or position within the operational environment. The set of actions can include: movement between areas (or polygons), engagement or avoidance of threat entities; observation of the operational environment; securing of areas; coordinate support, fires or effects, and/or sustainment, etc.; and/or conditional transitions, along the target path from the initial polygon to the target polygon, based on risk or feasibility criteria; etc.

The system can repeat the foregoing methods and techniques to invoke the set of agents to generate additional courses of action—in a set of courses of action including the first course of action—for the mission based on the set of operations data, such as based on other paths in the set of paths.

Accordingly, by invoking agents to execute reasoning tasks over the combination of spatial structures, the system can: evaluate movement feasibility, cost, and risk in a structured manner; derive candidate paths based on movement feasibility, risk, and/or cost (e.g., fuel, time); and generate corresponding courses of action representing coordinated sets of actions for one or more target entities.

6.2.1 Selected Agent Persona

In one implementation, the system derives the set of characteristics—from the set of operations data—including a selected practitioner persona in the set of practitioner personas including: a military commander; an intelligence officer; a chief of fires; a sustainment officer; a special operations commander; etc.

Additionally or alternatively, the system can identify the selected practitioner persona based on user input.

Each practitioner persona, in the set of practitioner personas, is associated with a distinct (e.g., different) configuration defining: mission role; risk tolerance (e.g., threshold risk score); prioritization of time versus risk; movement constraints (e.g., threshold effective traversability value); preferred movement patterns; etc.

In this implementation, the system: configures the set of agents to execute tasks and/or nodes, in the set of nodes, according to a configuration associated with the selected practitioner persona; and invokes the set of agents to generate a course of action via execution of nodes, in the set of nodes, according to the selected practitioner persona (and/or to a configuration associated with the selected practitioner persona). The selected practitioner persona can be associated with: a threshold effective traversability value; and a threshold risk score.

In one example, the system: identifies the selected practitioner persona corresponding to a special operations commander; and invokes the set of agents to generate a course of action via execution of nodes, in the set of nodes, according to the special operations commander associated with a first threshold effective traversability value; and a first threshold risk score.

In another example, the system: identifies the selected practitioner persona corresponding to a sustainment officer; and invokes the set of agents to generate a course of action via execution of nodes, in the set of nodes, according to the sustainment associated with a second threshold effective traversability value and a second threshold risk score. The second threshold effective traversability value can exceed the first threshold effective traversability value. The second threshold risk score can fall below the first threshold risk score.

More specifically, the system can execute the foregoing methods and techniques to generate the hierarchical spatial structure including a set of regions in the reference coordinate system based on the set of layers of the environment state representation. Each region, in the set of regions is characterized by a maximum risk score of the region based on elements, of layers in the set of layers, that spatially intersect the region.

Additionally, the system can execute the foregoing methods and techniques to identify a subset of regions in the set of regions based on the threshold risk score associated with the selected practitioner persona. Each region in the subset of regions is characterized by a maximum risk score falling below the threshold risk score. The system can execute the foregoing methods and techniques: to derive a set of areas, in the operational environment and relative to the reference coordinate system, traversable by the target entity corresponding to the subset of regions; and to generate the navigation mesh structure including the set of polygons representing the set of areas. Each polygon, in the set of polygons, is characterized by: a terrain score; a risk score; and/or a cost value.

The system can then execute the foregoing methods and techniques to invoke the set of agents: to select a set of paths from the initial polygon to the target polygon via a subset of polygons in the set of polygons; to calculate the target path, in the set of paths, based on terrain scores, risk scores, and/or cost values of polygons in the subset of polygons; and to generate the course of action for the mission based on the target path. Each polygon, in the subset of polygons, is: contained in the subset of regions; and characterized by a risk score falling below a threshold risk score for the selected practitioner persona.

Accordingly, by deriving a selected practitioner persona and configuring agents to execute reasoning tasks according to persona-specific constraints and preferences, the system can enable generation of courses of action that reflect different operational roles and risk postures that may be consistent with the user's role, constraints, and/or preferences.

6.3 Example: Fuel Consumption+Arrival Time Constraints

In one example, the system: accesses a set of operations data for a mission; and derives a set of characteristics of the mission based on the set of operations data. The set of characteristics can include: a target position, for a target entity, representing an objective of the mission; a threshold fuel consumption for the mission; and a threshold arrival time for the mission.

In this example, the system accesses (or generates) the navigation mesh structure including a set of polygons representing a set of areas, in an operational environment and relative to a reference coordinate system, traversable by a target entity according to the hierarchical spatial structure. The set of polygons: is connected by a set of edges representing thoroughfares between adjacent polygons and accessible by the target entity; is characterized by a set of cost values based on terrain scores and risk scores of the set of polygons; and includes a first polygon characterized by a first set of movement attributes based on surface composition and weather within a first area, in the set of areas, corresponding to the first polygon according to layers of the environment state representation. The first set of movement attributes represent: a first soil type; and a first rain intensity; etc.

In this example, the system invokes the set of agents to generate a course of action for the mission by: identifying an entity type (e.g., a vehicle type) of the target entity; accessing a first fuel consumption rate for the entity type according to the first soil type and the first rain intensity; accessing a first movement speed for the entity type according to the first soil type and the first rain intensity; and calculating a target path, from an initial polygon containing an initial position occupied by the target entity to a target polygon containing the target position via a first group of polygons in the set of polygons, based on the set of cost values, the first fuel consumption rate, and/or the first movement speed.

6.3.1 Fuel Consumption Rate+Fuel Consumption Estimate

More specifically, the system can access a first table defining a set of fuel consumption rates for an entity characterized by the entity type according to a set of soil types and a set of rain intensities (e.g., absence of rain, light rain intensity, moderate rain intensity, heavy rain intensity).

For a first soil type in the set of soil types, the first table defines: a first fuel consumption rate, in the set of fuel consumption rates, for an entity—characterized by the entity type—maneuvering in the first soil type based on a first rain intensity (e.g., absence of rain) in the set of rain intensities; and a second fuel consumption rate, in the set of fuel consumption rates, for the entity maneuvering in the first soil type based on a second rain intensity (e.g., light rain intensity) in the set of rain intensities; etc.

For each soil type in the set of soil types and for each rain intensity in the set of rain intensities, the first table defines a fuel consumption rate, in the set of fuel consumption rates, for the entity maneuvering in the soil type based on the rain intensity.

For a first polygon in the first group of polygons, the system: accesses the first set of movement attributes, of the first polygon, representing the first soil type and the first rain intensity; retrieves the first fuel consumption rate from the first table according to the first soil type and the first rain intensity; and derives a first partial fuel consumption estimate, in a set of partial fuel consumption estimates, based on the first fuel consumption rate and a first distance of a first segment of the target path advanced through the first polygon.

The system can repeat the foregoing methods and techniques for each polygon in the first group of polygons: to access a set of movement attributes, of the polygon, representing a soil type—in the set of soil types—and a rain intensity in the set of rain intensities; to retrieve a fuel consumption rate from the first table according to the soil type and the rain intensity; and to derive a partial fuel consumption estimate, in the set of partial fuel consumption estimates, based on the fuel consumption rate and a distance of a segment of the target path advanced through the polygon.

The system can then derive a fuel consumption estimate (or an "aggregate fuel consumption estimate") for advancement of the target entity along the target path from the initial polygon to the target polygon via the first group of polygons based on (e.g., a sum of) the set of partial fuel consumption estimates.

6.3.4 Movement Speed+Arrival Time Estimate

Additionally or alternatively, the system can access a second table defining a set of movement speeds (e.g., nominal movement speeds, average movement speeds) for an entity characterized by the entity type according to the set of soil types and the set of rain intensities.

For a first soil type in the set of soil types, the first table defines: a first movement speed, in the set of movement speeds, for an entity—characterized by the entity type—maneuvering in the first soil type based on a first rain intensity (e.g., absence of rain) in the set of rain intensities;

and a second movement speed, in the set of movement speeds, for the entity maneuvering in the first soil type based on a second rain intensity (e.g., light rain intensity) in the set of rain intensities; etc.

For each soil type in the set of soil types and for each rain intensity in the set of rain intensities, the first table defines a movement speed, in the set of movement speeds, for the entity maneuvering in the soil type based on the rain intensity.

For the first polygon in the first group of polygons, the system: accesses the first set of movement attributes, of the first polygon, representing the first soil type and the first rain intensity; retrieves the first movement speed from the second table according to the first soil type and the first rain intensity; and derives a first partial temporal cost estimate, in a set of partial temporal cost estimates, based on the first movement speed and a first distance of a first segment of the target path advanced through the first polygon.

The system can repeat the foregoing methods and techniques for each polygon in the first group of polygons: to access a set of movement attributes, of the polygon, representing a soil type—in the set of soil types—and a rain intensity in the set of rain intensities; to retrieve a movement speed from the second table according to the soil type and the rain intensity; and to derive a partial temporal cost estimate, in the set of partial temporal cost estimates, based on the movement speed and a distance of a segment of the target path advanced through the polygon.

The system can then: derive a temporal cost estimate (or an "aggregate temporal cost estimate") for advancement of the target entity along the target path from the initial polygon to the target polygon via the first group of polygons based on (e.g., a sum of) the set of partial fuel consumption estimates; and derive an arrival time estimate for advancement of the target entity along the target path from the initial polygon to the target polygon via the first group of polygons based on the temporal cost estimate.

6.3.5 Target Path Validation

In this example, the system: identifies a set of paths from the initial polygon to the target polygon via the set of polygons. Each path, in the set of paths, is: associated with a group of polygons in the set of polygons; and characterized by a cost score, in a set of cost scores, based on cost values of polygons in the group of polygons. The system then: for each path in the set of paths, calculates the cost score based on cost values of polygons in the group of polygons; selects the target path, in the set of paths, characterized by a lowest cost score in the set of cost score; and generates the course of action based on the target path.

More specifically, the system can select the target path for the course of action in response to: the fuel consumption estimate falling below the threshold fuel consumption for the mission; and/or the arrival time estimate falling below the threshold arrival time for the mission.

In one variation, the system selects the target path for the course of action in response to the temporal cost estimate falling below a threshold temporal cost for the mission.

6.4 Visualization+User Feedback

In one implementation, the system: generates a visualization indicating the set of courses of action in Block S166; and serves the visualization to a user in Block S168.

For example, for each course of action in the set of courses of action, the system can generate the visualization indicating: a description (e.g., a course of action statement) of the course of action; and/or a graphical depiction (e.g., a course of action sketch) of the course of action; etc.

Additionally, for each course of action, the system can generate the visualization indicating (e.g., flagging): key terrain (e.g., high ground, a dry channel, infrastructure) associated with the course of action; overwatch positions; canalizing terrain; low-exposure avenues of approach; etc.

In another implementation, in Block S170, the system accesses a set of user feedback.

In one example, the system receives the set of user feedback representing confirmation and/or selection of a course of action(s) for simulation.

In another example, the system receives the set of feedback representing rejection and/or modification of a course of action.

In this example, the system executes the foregoing methods and techniques to generate a new course of action based on the set of operations data and the set of feedback.

More specifically, the system can access the set of user feedback representing rejection of the first course of action and/or defining a rain intensity (e.g., heavy rain intensity, absence of rain) in the operational environment. The system can execute the foregoing methods and techniques to calculate a second set of terrain scores for the set of polygons based on: sets of movement attributes of polygons in the set of polygons; and the rain intensity—defined by the set of user feedback—in the operational environment. The system can then execute similar methods and techniques described above: to invoke the set of agents to generate a second course of action for the mission by calculating a second path—from the initial polygon to the target polygon via the set of polygons and different from the target path—based on the second set of terrain scores and the set of risk scores; to generate a second visualization indicating the second course of action; and to serve the visualization to the user.

7. Course of Action Simulation+Evaluation

The method S100 includes: invoking the set of agents to simulate execution of the first course of action based on the navigation mesh structure in Block S162; calculating a first set of effects from the first course of action based on simulated execution of the first course of action in Block S164; generating a visualization indicating a description of the first course of action and the first set of effects from the first course of action in Block S166; and serving the visualization to the user in Block S168.

Generally—in Blocks S162, S164, S166, and S168—the system can: simulate execution of courses of action based on a combination of spatial structures; compute effects of the courses of action based on simulated execution of these courses of action; generate a visualization indicating these effects; and serve the visualization to a user.

More specifically, in Block S162, the system can simulate execution of a course of action for a mission over a set of time intervals by invoking agents to propose actions and/or adjudicate interactions between the actions based on the environment state representation and the combination of spatial structures. The system can: execute the simulation in a turn-by-turn manner according to the set of time intervals; and update the environment state representation between successive time intervals.

Accordingly, the system can: access real-time (or near-real-time) data (e.g., location data, weather data, threat intelligence, friendly unit data, threat unit data) associated with a mission and/or an operational environment associated with the mission; generate the combination of spatial structures representing the operational environment based on the real-time data; autonomously generate many courses of action based on the real-time data and/or the spatial structure(s); and simulate execution of the courses of action according to the combination of spatial structure. The system can then: calculate (or identify) a set of effects—such as statistics representing a likelihood of achieving an objective of the mission, a mission duration, a quantity of casualties incurred, an amount of fuel expended, a quantity of ammunition expended, and/or a risk score, etc.—for each course of action; generate a visualization (selectively) indicating these courses of action and the set of effects for each course of action; and serve the visualization to a user.

Therefore, the system can: reduce a duration of time and/or an amount of manual effort for developing and evaluating a course of action for a mission; greatly increase a quantity of courses of action generated and evaluated for the mission, including exploration of edge cases or unorthodox options; and/or report effects for each course of action at a finer granularity, thereby augmenting the user with critical information in order to accelerate and improve decision-making for the mission.

7.1 Simulation Agents

In one implementation, the system includes and/or interfaces with the set of agents. The set of agents includes: a first agent (hereinafter "the blue agent") representing a friendly force (e.g., the target entity); a second agent (hereinafter "the red agent") representing an adversary force (e.g., a threat entity); and a third agent (e.g., a "facilitator" agent) that orchestrates simulated execution of a course of action.

In this implementation, the system invokes the facilitatory agent: to control progression of the simulation for a set of phases corresponding to the set of time intervals; to selectively expose information—such as according to layers of the environment state representation—to the blue agent and the red agent; to adjudicate outcomes of actions proposed by the blue agent and the red agent; and to maintain a context for the simulation across the set of phases based on the actions and the outcomes.

In this implementation, the system: invokes the blue agent to propose actions for the friendly force during a time interval based on the course of action, the combination of spatial structures, and information available to the friendly force; and invokes the red agent to propose actions for the adversary force during the time interval based on an adversary course of action, the combination of spatial structures, and information available to the adversary force.

7.2 First Phase

Generally, the system can invoke the set of agents to simulate execution of the first course of action for a first phase, in the set of phases, corresponding to a first time interval in the set of time intervals.

In one implementation, the system accesses a first subset of layers, in the set of layers of the environment state representation, corresponding to the first time interval. The first subset of layers represent: slope, elevation, and surface composition of the operational environment during the first time interval; the set of roads in the operational environment during the first time interval; weather in the operational environment during the first time interval; the set of entities in the operational environment during the first time interval; and threat surfaces representing threat effects of weapons systems of the set of entities during the first time interval.

In another implementation, in Blocks S120 and/or S130, the system generates the combination of spatial structures based on the first subset of layers.

For example, the system can generate a navigation mesh structure including a set of polygons: representing a set of areas, in the operational environment and relative to the reference coordinate system, traversable by the target entity; and connected by a set of edges representing thoroughfares between adjacent polygons and accessible by the target entity. The set of polygons can include a first polygon—corresponding to a first area in the set of areas—characterized by: a first set of movement attributes (e.g., a first soil type, a first rain intensity) based on surface composition and weather within the first area during the first time interval; and a first cost value based on the first set of movement attributes.

In another implementation, in Block S160, the system accesses the first course of action, in the set of courses of action, for the mission. The first course of action includes a set of actions (e.g., a series of actions) for the target entity along the target path from the initial polygon—containing an initial position occupied by the target entity—to the target polygon containing the target position via the set of polygons. For example, the first course of action includes a first action representing advancement of the target entity through the first polygon and/or engagement with a threat entity.

In another implementation, in Block S162, the system invokes the set of agents to simulate execution of the first course of action—for the first phase—based on the combination of spatial structures (e.g., the first set of movement attributes, the first cost value).

For example, the facilitator agent can generate a first prompt: indicating a first subset of information (e.g., the initial polygon containing the initial position occupied by the target entity) based on the first subset of layers and/or the navigation mesh structure; indicating the first course of action based on the target path from the initial polygon to the target polygon via the first group of polygons; and invoking the blue agent to propose an action for the first phase. The facilitator agent can then serve the first prompt to the blue agent.

In this example, in response to accessing the first prompt, the blue agent can: generate a second prompt proposing the first action, in the first course of action, based on the first prompt; and serve the second prompt to the facilitator agent. The first action can represent advancement of the target unit through the first polygon—from the first polygon to a second polygon in the first group of polygons—along the target path and engagement with the threat entity.

In this example, in response to accessing the second prompt, the facilitator agent can update the context of the simulation based on the second prompt and generate a third prompt: indicating a second subset of information (e.g., a third polygon containing a position occupied by the threat entity) based on the first subset of layers and/or the navigation mesh structure; indicating detection of the target entity in the second polygon; and invoking the red agent to act for the first phase. The facilitator agent can then serve the third prompt to the red agent.

In this example, in response to accessing the third prompt, the red agent can: generate a fourth prompt indicating a second action (e.g., a reaction, a counteraction) based on the third prompt, such as advancement of the threat entity from the third polygon to a fourth polygon; and serve the fourth prompt to the facilitator agent. A first distance—between the third polygon and the second polygon—exceeds a second distance between the fourth polygon and the second polygon.

In this example, in response to accessing the third prompt, the facilitator agent can adjudicate the first action and the second action based on: the first subset of layers of the environment state representation; the combination of spatial structures (e.g., the first set of movement attributes of the first polygon in the navigation mesh structure); and/or simulation rules (e.g., a correlation of force model).

More specifically, the facilitator agent resolves an interaction between the first action of the target entity and the second action of the threat entity based on: spatial proximity between the target entity and the threat entity; threat surfaces representing threat effects of weapons systems of the target entity and the threat entity; timing of actions; and/or relative capabilities of the target entity and the threat entity.

The facilitator agent can then: compute a first subset of effects, in a first set of effects from the first course of action, of the first phase and/or the interaction; and update layers of the environment state representation—for a second time interval in the set of time intervals—based on the first subset of effects. The subset of effects can represent: changes in entity positions; changes in entity states (e.g., damaged, neutralized, delayed, resupplied); and/or resource consumption (e.g., fuel, time, ammunition); etc.

In particular, the system can execute similar methods and techniques described above: to identify an entity type of the target entity; to identify an engagement type (e.g., offensive, defensive) of the engagement with the threat entity; to access a first fuel consumption rate for the entity type from the first table according to the first set of movement attributes (e.g., the first soil type, the first rain intensity) and the engagement type; and to derive a first partial fuel consumption estimate, in the set of partial fuel consumption estimates, based on the fuel consumption rate and a distance of a segment of the target path advanced through the first polygon. The system can then calculate the first subset of effects representing the first partial fuel consumption estimate.

7.3 Subsequent Phases

The system repeats the foregoing methods and techniques for each phase in the set of phases of the simulation.

More specifically—for a second phase, in the set of phases, corresponding to the second time interval—the system can execute the foregoing methods and techniques: to access a second subset of layers, in the set of layers of the environment state representation, corresponding to the second time interval; and to generate (or update) the combination of spatial structures (e.g., the navigation mesh structure) based on the second subset of layers. The second subset of layers represents: slope, elevation, and surface composition of the operational environment during the second time interval; the set of roads in the operational environment during the second time interval; weather in the operational environment during the second time interval; the set of entities in the operational environment during the second time interval; and threat surfaces representing threat effects of weapons systems of the set of entities during the second time interval.

In particular, the system can update the set of polygons to include the first polygon characterized by: a second set of movement attributes (e.g., the first soil type, a second rain intensity) based on surface composition and weather within the first area during the second time interval; and a second cost value based on the second set of movement attributes.

The system can then execute the foregoing methods and techniques: to invoke the set of agents to simulate execution of the first course of action—for the second phase—based on the combination of spatial structures (e.g., the second set of movement attributes, the second cost value); to compute a second subset of effects, in the first set of effects, of the second phase; and to update layers of the environment state representation for a third time interval in the set of time intervals based on the second subset of effects.

For example, the system can invoke the set of agents to simulate execution of a third action—in the set of actions and associated with the first polygon during the second time interval—based on the second set of movement attributes.

7.4 Course of Action Effects+Visualization

In one implementation, in Block S164, the system calculates the first set of effects from the first course of action based on simulated execution of the first course of action. The first set of effects can include (or indicate): a first likelihood of achieving the objective of the mission; a first mission duration; a first quantity of casualties incurred; a first set of resource consumption values representing quantities of resources (e.g., fuel, ammunition, temporal cost) consumed by the target entity, such as a fuel consumption estimate for advancement of the target entity along the target path via the first polygon; an arrival time of the target entity at the target position; and/or a first risk exposure value (or risk score) for the first course of action.

For example, the system can calculate a fuel consumption estimate based on (e.g., a sum of) the set of partial fuel consumption estimates.

In another implementation, the system: generates a visualization indicating the first set of effects from the first course of action in Block S166; and serves the visualization to the user in Block S168. The system can generate the visualization in response to completion of the simulated execution of the first course of action (e.g., completion of the set of phases).

Additionally, the system can generate the visualization: indicating a description of the first course of action and/or a summary of an outcome of the first course of action; and depicting the target path (and/or an actual path traversed by the target entity during the simulated execution of the first course of action) in the operational environment based on a map image of the operational environment.

7.5 Multiple Courses of Action

The system can execute the foregoing methods and techniques for each course of action in the set of courses of action: to invoke the set of agents to simulate execution of the course of action based on the combination of spatial structures and/or layers of the environment state representation; to calculate a set of effects from the course of action based on simulated execution of the course of action; to generate a visualization indicating a description of the course of action, a summary of an outcome of the course of action, and/or the set of effects; and to serve the visualization to the user.

7.5.1 Course of Action Scoring+Ranking

In one variation, for each course of action in the set of courses of action, the system executes the foregoing methods and techniques: to invoke the set of agents to simulate execution of the course of action based on the combination of spatial structures (e.g., the navigation mesh structure) and/or layers of the environment state representation in Block S162; and to calculate a set of effects from the course of action based on simulated execution of the course of action in Block S164.

In this variation, the system accesses a set of metrics for the mission, such as a timeliness mission metric, a survivability mission metric, and a resource efficiency metric. For each course of action in the set of courses of action, the system calculates a score, in a set of scores, for the course of action based on the set of metrics and the set of effects in Block S172.

For example, the system can access the first set of effects—from the first course of action—including: the first arrival time of the target entity at the target position; a first risk exposure value; and the first set of resource consumption values (e.g., the first fuel consumption estimate).

In this example, the system can: calculate a first metric score for the timeliness mission metric based on a difference between the first arrival time and a target arrival time (or the threshold arrival time) for the mission; calculate a second metric score for the survivability mission metric based on the first risk exposure value and/or the first quantity of casualties incurred; and calculate a third metric score for the resource efficiency metric based on the first set of resource consumption values, such as based on a difference between the first fuel consumption estimate and the threshold fuel consumption for the mission.

In this example, the system can then calculate a first score, in the set of scores, of the first course of action based on a combination (e.g., a weighted combination) of the first metric score, the second metric score, and the third metric score.

The system repeats the foregoing methods and techniques for each course of action in the set of courses of action: to calculate (or access) a set of metrics from the course of action; and to calculate a score, in the set of scores, for the course of action based on the set of metrics and the set of effects.

In this variation, the system: ranks the set of courses of action based on the set of scores; selects a subset of courses of action, in the set of courses of action, characterized by highest scores in the set of scores in Block S174; generates a visualization indicating sets of effects for the subset of courses of action in Block S166; and serves the visualization to the user in Block S168.

More specifically, the system can generate the visualization indicating: a description (or explanation) of each course of action in the subset of courses of action; and/or tradeoffs between courses of action in the subset of courses of action; etc.

Therefore, the system can: concurrently simulate many courses of action within an accurate representation of the area of operations for a mission; and report statistics and/or tradeoffs for each course of action based on simulation to a user, thereby augmenting the user with critical information in order to accelerate and improve decision-making for the mission.

7.5.2 Decisive Point Detection

In another variation, the system: identifies a first subset of courses of action, in the set of courses of action, that achieve the objective(s) of the mission during simulated executions of the set of courses of action in Block S176; and detects a decisive point associated with a target action at an intermediate position (e.g., along the target path) at a target time interval based on convergence of the target action at the intermediate position at the target time across simulated executions of the first subset of courses of action in Block S178.

More specifically, the system can detect the decisive point by detecting recurrence of the target action at the intermediate position at the target time interval—prior to achieving the objective of the mission—across simulated execution of the first subset of courses of action.

In this variation, the system: generates a visualization indicating the decisive point associated with the target action at the intermediate position at the target time interval in Block S166; and serves the visualization to the user in Block S168.

For example, the system can: generate a synchronization matrix representing actions and effects associated with simulated execution of a course of action across the set of time intervals; and populate the synchronization matrix with actions associated with entities at corresponding time intervals.

More specifically, the system can indicate the decisive point: at a column, in the synchronization matrix, corresponding to the target time interval; and at a row, in the synchronization matrix, associated with an entity executing the target action at the intermediate position.

In this example, the system can: generate the visualization including the synchronization matrix; and serve the visualization to the user.

Accordingly, by detecting decisive points based on convergence of actions across simulated executions of courses of action that achieve a mission objective (or fail to achieve the mission objective), the system can: identify intermediate actions and/or positions that are determinative of mission success (or mission failure); and expose critical points in course of action execution that warrant attention, coordination, and/or protection to the user.

7.6 User Feedback

In another variation, the system executes the foregoing methods and techniques: to receive a set of feedback representing rejection and/or modification of a course of action from the user based on a set of effects for the course of action; to generate a new course of action based on the set of operations data and the feedback; to simulate execution of the new course of action based on the combination of spatial structures and/or layers of the environment state representation; to generate a new visualization indicating a new set of effects for the new course of action responsive to simulated execution; and to serve the new visualization to the user.

8. Disclaimers

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor, but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:

1. A method comprising:

accessing a set of operations data of a mission from a user;

deriving a set of characteristics of the mission based on the set of operations data, the set of characteristics comprising:
a target entity; and
a target position, in an operational environment, associated with the target entity and representing an objective of the mission;
accessing an environment state representation comprising a set of layers comprising:
a first layer representing topography of the operational environment relative to a reference coordinate system;
a second layer representing a set of roads in the operational environment relative to the reference coordinate system; and
a third layer comprising a set of surfaces, in the reference coordinate system, corresponding to a set of adversarial threat entities occupying positions in the operational environment, the set of surfaces comprising a first surface representing a region of the operational environment within physical range of a first weapons system, of a first adversarial threat entity in the set of adversarial threat entities, from a first position occupied by the first adversarial threat entity, the region derived based on:
the first position;
topography of the operational environment; and
a physical range of the first weapons system;
based on the set of layers, generating a navigation mesh structure by:
deriving a set of areas, in the operational environment and relative to the reference coordinate system, traversable by the target entity;
generating a set of polygons:
representing the set of areas, each polygon characterized by a set of movement attributes; and
connected by a set of edges representing thoroughfares between adjacent polygons and accessible by the target entity;
calculating a first terrain score of a first polygon in the set of polygons based on a first set of movement attributes of the first polygon; and
calculating a first risk score of the first polygon based on the first surface overlapping the first polygon, the first risk score representing physical risk to the target entity from the first weapons system;
invoking a set of agents that generates a first course of action associated with the mission by:
selecting a set of paths from an initial polygon in the set of polygons to a target polygon in the set of polygons, the initial polygon containing an initial position occupied by the target entity, the target polygon containing the target position, the set of paths comprising a first path from the initial polygon to the target polygon via a first group of polygons, in the set of polygons, comprising the first polygon;
calculating a first cost score, in a set of cost scores, of the first path based on:
a first group of terrain scores, of the first group of polygons, comprising the first terrain score; and
a first group of risk scores, of the first group of polygons, comprising the first risk score; and
selecting the first path, in the set of paths, as a target path of the first course of action based on the set of cost scores;
generating a visualization indicating the first course of action; and
serving the visualization to the user.

2. The method of claim 1:
wherein accessing the environment state representation comprises accessing the environment state representation comprising the set of surfaces comprising a second surface representing a second region of the operational environment within physical range of a second weapons system, of a second adversarial threat entity in the set of adversarial threat entities, from a second position occupied by the second adversarial threat entity, the second region derived based on:
the second position;
topography of the operational environment; and
a second physical range of the second weapons system; and
wherein generating the navigation mesh structure comprises calculating a second risk score of a second polygon in the set of polygons based on the first surface and the second surface overlapping the second polygon, the second risk score:
representing physical risk to the target entity from the first weapons system and the second weapons system; and
exceeding the first risk score.

3. The method of claim 2, wherein selecting the set of paths comprises selecting the set of paths from the initial polygon to the target polygon via a subset of polygons in the set of polygons, each polygon in the subset of polygons characterized by a risk score falling below a threshold risk score, the subset of polygons:
comprising the first polygon; and
excluding the second polygon.

4. The method of claim 1, wherein invoking the set of agents that generates the first course of action comprises:
accessing a task graph comprising a set of nodes representing a sequence of tasks, each node in the set of nodes containing logic defining behavior that guides execution of a task in the sequence of tasks; and
invoking the set of agents that generates the first course of action via execution of nodes, in the set of nodes, according to a selected practitioner persona in a set of practitioner personas by:
selecting the set of paths from the initial polygon to the target polygon via a subset of polygons in the set of polygons, each polygon in the subset of polygons characterized by a risk score falling below a threshold risk score associated with the selected practitioner persona, the subset of polygons comprising the first group of polygons; and
calculating the first cost score based on the first group of terrain scores and the first group of risk scores of the first group of polygons in the subset of polygons.

5. The method of claim 4:
wherein calculating the first cost score comprises:
calculating a first cost value, in a set of cost values of polygons in the first group of polygons, of the first polygon based on the first terrain score and the first risk score; and
calculating the first cost score of the first path based on a sum of the set of cost values; and
wherein selecting the first path as the target path comprises selecting the first path, characterized by a lowest cost score in the set of cost scores, as the target path.

6. The method of claim 4:

wherein selecting the set of paths comprises:

accessing a hierarchical spatial structure representing a set of regions in the reference coordinate system, each region in the set of regions characterized by a maximum risk score of the region based on elements, of layers in the set of layers, that spatially overlap the region;

identifying a subset of regions in the set of regions, each region in the subset of regions characterized by a maximum risk score falling below the threshold risk score; and selecting the set of paths from the initial polygon to the target polygon via the subset of polygons, each polygon in the subset of polygons contained in the subset of regions.

7. The method of claim 4, wherein invoking the set of agents that generates the first course of action comprises invoking the set of agents that generates the first course of action via execution of nodes according to the selected practitioner persona in the set of practitioner personas comprising:

a sustainment officer; and an intelligence officer.

* * * * *